(12) United States Patent
Kawanoue et al.

(10) Patent No.: US 11,036,199 B2
(45) Date of Patent: Jun. 15, 2021

(54) CONTROL DEVICE, CONTROL PROGRAM, AND CONTROL METHOD FOR ANOMALY DETECTION

(71) Applicant: OMRON Corporation, Kyoto (JP)

(72) Inventors: Shinsuke Kawanoue, Kyoto (JP); Yoshihide Nishiyama, Yokohama (JP)

(73) Assignee: OMRON Corporation, Kyoto (JP)

( * ) Notice: Subject to any disclaimer, the term of this patent is extended or adjusted under 35 U.S.C. 154(b) by 57 days.

(21) Appl. No.: 16/461,011

(22) PCT Filed: Nov. 27, 2017

(86) PCT No.: PCT/JP2017/042407
§ 371 (c)(1),
(2) Date: May 15, 2019

(87) PCT Pub. No.: WO2018/110259
PCT Pub. Date: Jun. 21, 2018

(65) Prior Publication Data
US 2019/0294137 A1    Sep. 26, 2019

(30) Foreign Application Priority Data

Dec. 14, 2016  (JP) .............................. JP2016-242303
Jun. 8, 2017  (JP) .............................. JP2017-113195

(51) Int. Cl.
 *G05B 19/05* (2006.01)
 *G06N 20/00* (2019.01)
 *G05B 23/02* (2006.01)

(52) U.S. Cl.
 CPC ........... *G05B 19/05* (2013.01); *G05B 19/058* (2013.01); *G05B 23/024* (2013.01);
 (Continued)

(58) Field of Classification Search
 CPC .................. G05B 19/05; G05B 19/058; G05B 2219/13086; G05B 2219/25255;
 (Continued)

(56) References Cited

U.S. PATENT DOCUMENTS 10,193,780 B2 *  1/2019  Gopalakrishnan ... G06K 9/6247
2003/0114965 A1  6/2003  Fiechter et al.
(Continued)

FOREIGN PATENT DOCUMENTS

CN       102282516 A    12/2011
CN       103403633 A    11/2013
(Continued)

OTHER PUBLICATIONS

English translation of the International Search Report("ISR") of PCT/JP2017/042407 dated Feb. 20, 2018.
(Continued)

*Primary Examiner* — Chun Cao
(74) *Attorney, Agent, or Firm* — Metrolex IP Law Group, PLLC

(57) ABSTRACT

A control device includes feature amount generating means for generating a feature amount suitable for detecting an anomaly that occurs in a control target from data that relates to the control target, machine learning means for carrying out machine learning using the feature amount generated by the feature amount generating means, anomaly detecting means for detecting the anomaly, based on the feature amount generated by the feature amount generating means and an anomaly detection parameter determined based on a learning result of the machine learning and used in detection of the anomaly that occurs in the control target, instructing means for instructing the anomaly detecting means to perform detection of the anomaly, and data compressing means for data-compressing the feature amount generated by the
(Continued)

feature amount generating means, and providing the data-compressed feature amount to the machine learning means and the anomaly detecting means.

18 Claims, 15 Drawing Sheets

(52) U.S. Cl.
CPC ..... *G05B 23/0254* (2013.01); *G05B 23/0283* (2013.01); *G06N 20/00* (2019.01); *G05B 2219/13086* (2013.01); *G05B 2219/25255* (2013.01)

(58) Field of Classification Search
CPC .............. G05B 23/024; G05B 23/0254; G05B 23/0283; G06N 20/00
USPC ..................................................... 700/18, 26
See application file for complete search history.

(56) References Cited

U.S. PATENT DOCUMENTS

| | | | |
|---|---|---|---|
| 2005/0066241 | A1 | 3/2005 | Gross et al. |
| 2007/0265713 | A1* | 11/2007 | Veillette ............. G05B 23/0245 700/30 |
| 2011/0173497 | A1 | 7/2011 | Nakatani et al. |
| 2012/0041575 | A1 | 2/2012 | Maeda et al. |
| 2012/0290879 | A1 | 11/2012 | Shibuya et al. |
| 2014/0012402 | A1 | 1/2014 | Nishiyama et al. |
| 2016/0098037 | A1 | 4/2016 | Zornio et al. |
| 2018/0164770 | A1* | 6/2018 | Kawanoue ........... G05B 13/028 |

FOREIGN PATENT DOCUMENTS

| | | |
|---|---|---|
| JP | H02-002408 A | 1/1990 |
| JP | H06-052474 A | 2/1994 |
| JP | H11-175142 A | 7/1999 |
| JP | 2000-056823 A | 2/2000 |
| JP | 2010-009369 A | 1/2010 |
| JP | 2011-070635 A | 4/2011 |
| JP | 2011-145831 A | 7/2011 |
| JP | 2012-194663 A | 10/2012 |
| JP | 2012-194936 A | 10/2012 |
| JP | 2013-008111 A | 1/2013 |
| JP | 2013-025461 A | 2/2013 |
| JP | 2014-170269 A | 9/2014 |
| WO | 2016/189709 A1 | 12/2016 |

OTHER PUBLICATIONS

Written Opinion("WO") of PCT/JP2017/042407 dated Feb. 20, 2018.
Extended European search report dated Apr. 9, 2018 in a counterpart European patent application.
Office action dated May 8, 2018 in a counterpart Japanese patent application.
Office action dated Aug. 21, 2018 in a counterpart Japanese patent application.
Chinese Office Action (CNOA) dated Mar. 24, 2020 in a counterpart Chinese patent application.
U.S. Office Action dated Oct. 26, 2020 for the sibling U.S. Appl. No. 15/787,739.
Office Action (JPOA) dated Dec. 15, 2020 in a counterpart Japanese patent application.
Notice of Allowance and Fee(s) Due and List of References cited by applicant and considered by examiner dated Jan. 25, 2021 in a related U.S. Appl. No. 15/787,739.
Supplemental Notice of Allowability and List of References cited by applicant and considered by examiner dated Feb. 12, 2021 in a related U.S. Appl. No. 15/787,739.

* cited by examiner

FIG. 8

| Target Data | Area | Change Behavior | | Feature Amount Name |
|---|---|---|---|---|
| Single data | Time Area | Change in median value | Average / Median value graph | Median value |
| Single data | Time Area | Change in difference | x−y | Difference |
| Single/ plural data | Time Area | Change in ratio | x/y | Ratio |
| Single/ plural data | Time Area | Change in duty ratio | | Duty ratio |
| Single data | Time Area | Change in max. value | | Max. value |
| Single data | Time Area | Change in min. value | | Min. value |
| Plural data | Time Area | Increase in synchronization shift (multi-axis) | | Synchronization shift (multi-axis) _pulse |
| | | Increase in synchronization shift (dual-axis) | | Synchronization shift (dual-axis) _cyclic |
| Plural data | Time Area | Change in correlation value | | Correlation value |
| Plural data | Time Area | Change in Mahalanobis distance | | Mahalanobis distance |
| Plural data | Time Area | Change in Jackknife distance | $J_i = \sqrt{\frac{(n-1)n^2}{(n-1)n^3}} \times \frac{M^2}{1 - \frac{M_i}{(n-1)n^2}}$ | Jackknife distance |
| Single data | Time Area | Change in quartile | | Quartile |
| Single data | Time Area | Increase in cycle variation | | Cycle variation |

| Cluster | Data count | Average value | Standard deviation |
|---|---|---|---|
| 1 | 1585 | 75 | 3.55 |
| 2 | 875 | 20 | 5.25 |
| 3 | 952 | 95 | 2.05 |

134

| Input data | After serialization |
|---|---|
| {"val1": 9,<br>"val2": 15,<br>"val3": 30,<br>... } | ⟹ (cox82de9055u··········) |

CONTROL DEVICE, CONTROL PROGRAM, AND CONTROL METHOD FOR ANOMALY DETECTION

TECHNICAL FIELD

The present technology relates to a control device, a control program and a control method that enable a phenomenon occurring in a control target to be monitored.

RELATED ART

In various production sites, FA (Factory Automation) technologies using control devices such as PLCs (programmable controllers) are widely used. Such control devices in the FA field are also becoming more advanced in terms of performance and functionality, with the development of Information and Communication Technology (ICT) in recent years.

One way of achieving higher performance is to shorten the cycle of data input to the control device and data output from the control device. For example, JP 2012-194663 (Patent Document 1) discloses a technology that configures the cycle of communication for output and input of control data that is performed by a CPU unit of a PLC as a fixed time shorter than the maximum runtime of the control program.

Shortening the cycle of data input/output in such a manner enables control, monitoring, anomaly detection, anomaly prediction and the like to be realized with greater accuracy.

Also, JP 2013-008111 (Patent Document 2) discloses an anomaly predictive diagnostic device for diagnosing the presence of predictive signs of anomalies in machinery and equipment. With the anomaly predictive diagnostic device disclosed in Patent Document 2, multidimensional sensor data measured by a plurality of sensors installed in machinery and equipment is transmitted from respective machinery and equipment via a communication network. Diagnosis of anomaly predictive signs is performed on this multidimensional sensor data by data mining or the like.

RELATED ART DOCUMENTS

Patent Documents

Patent Document 1: JP 2012-194663A
Patent Document 2: JP 2013-008111A

SUMMARY OF THE INVENTION

Problems to be Solved by the Invention

Adopting a configuration such as disclosed in the above-mentioned Patent Document 1 enables fast acquisition of input data, but such a configuration cannot be applied to the anomaly predictive diagnostic device disclosed in Patent Document 2. This is because, with the anomaly predictive diagnostic device disclosed in Patent Document 2, multidimensional sensor data is transmitted via a communication network such as a LAN (Local Area Network) or a WAN (Wide Area Network), thus making it difficult to collect input data in the order of milliseconds or microseconds.

Thus, with the anomaly predictive diagnostic device disclosed in Patent Document 2, diagnosis is limited to predictive signs of anomalies associated with degradation that proceeds comparatively slowly.

The present technology provides a technology that enables a phenomenon occurring in a control target to be monitored in a shorter cycle.

Means for Solving the Problems

According to an aspect of the present invention, a control device for controlling a control target is provided. The control device includes feature amount generating means for generating a feature amount suitable for detecting an anomaly that occurs in the control target from data that relates to the control target, machine learning means for carrying out machine learning using the feature amount generated by the feature amount generating means, anomaly detecting means for detecting the anomaly, based on the feature amount generated by the feature amount generating means and an anomaly detection parameter determined based on a learning result of the machine learning and used in detection of the anomaly that occurs in the control target, instructing means for instructing the anomaly detecting means to perform detection of the anomaly, and data compressing means for data-compressing the feature amount generated by the feature amount generating means and providing the data-compressed feature amount to the machine learning means and the anomaly detecting means. The instructing means transmits a request required in detection of the anomaly to the anomaly detecting means, and the anomaly detecting means carries out detection of the anomaly, without sending a response to the request to the instructing means.

Preferably, the data compressing means converts data to be targeted, using machine code.

Preferably, the anomaly detecting means is realized by a user program that includes designation of the anomaly detection parameter and designation of the feature amount to be targeted.

Preferably, the control device further includes a database for collecting and storing data that relates to the control target.

Preferably, data designated in accordance with a command included in the user program is collected in the database.

Preferably, the control device further includes determining means for determining a technique for generating the feature amount suitable for detecting the anomaly that occurs in the control target, based on the data collected in the database.

Preferably, the control device further includes anomaly detection parameter determining means for determining the anomaly detection parameter based on the learning result of the machine learning.

Preferably, the control device further includes holding means for holding the anomaly detection parameter, and updating the anomaly detection parameter that is held, in response to a request from an external device.

According to another aspect of the present invention, a control program that realizes a control device for controlling a control target by being executed by a computer is provided. The control program causes the computer to execute a step of generating a feature amount suitable for detecting an anomaly that occurs in the control target from data that relates to the control target, a step of carrying out machine learning using the generated feature amount, a step of detecting the anomaly, based on the generated feature amount and an anomaly detection parameter determined based on a learning result of the machine learning and used in detection of the anomaly that occurs in the control target, a step of instructing detection of the anomaly, and a step of data-compressing the generated feature amount and providing data to be used in the machine learning and the anomaly detection. The step of detecting the anomaly includes a step of carrying out, after a request required in detection of the anomaly is transmitted, detection of the anomaly, without sending a response to the request.

According to yet another aspect of the present invention, a control method that is executed by a control device for controlling a control target is provided. The control method includes a step of generating a feature amount suitable for detecting an anomaly that occurs in the control target from data that relates to the control target, a step of carrying out machine learning using the generated feature amount, a step of detecting the anomaly, based on the generated feature amount and an anomaly detection parameter determined based on a learning result of the machine learning and used in detection of the anomaly that occurs in the control target, a step of instructing detection of the anomaly, and a step of data-compressing the generated feature amount and providing data to be used in the machine learning and the anomaly detection. The step of detecting the anomaly includes a step of carrying out, after a request required in detection of the anomaly is transmitted, detection of the anomaly, without sending a response to the request.

According to yet another aspect of the present invention, a control device for controlling a control target is provided. The control device includes data collecting means for collecting data that relates to the control target, feature amount generating means for generating a feature amount from data, detecting means for performing anomaly detection based on the feature amount and an anomaly detection parameter, instructing means for transmitting a request for anomaly detection to the detecting means, and a database. The detecting means, when some sort of anomaly is detected, stores the detected anomaly in the database, without replying that an anomaly was detected to the instructing means in response to the request for anomaly detection.

Preferably, the instructing means, after transmitting the request for anomaly detection to the detecting means, performs the next processing, without waiting for a response to the request for anomaly detection.

Preferably, processing in response to the request for anomaly detection is delegated from the instructing means to the detecting means.

Preferably, the instructing means executes processing in asynchronous with processing by the detecting means.

Preferably, the detecting means outputs an event log including the contents of the detected anomaly.

Preferably, the detecting means writes the anomaly detection result to the database, in addition to outputting an event log.

Preferably, the detecting means performs anomaly detection based on an anomaly detection parameter, and the anomaly detection parameter is configured to be updatable through access from a support device.

According to yet another aspect of the present invention, a control program that realizes a control device for controlling a control target by being executed by a computer is provided. The control program causes the computer to function as data collecting means for collecting data that relates to the control target, feature amount generating means for generating a feature amount from data, detecting means for performing anomaly detection based on the feature amount and an anomaly detection parameter, and instructing means for transmitting a request for anomaly detection to the detecting means. The detecting means, when some sort of anomaly is detected, stores the detected anomaly in a database, without replying that an anomaly was detected to the instructing means in response to the request for anomaly detection.

According to yet another aspect of the present invention, a control method that is executed by a control device for controlling a control target is provided. The control method includes the step of collecting data that relates to the control target, a step of generating a feature amount from data, a step of detecting means performing anomaly detection based on the feature amount and an anomaly detection parameter, a step of instructing means transmitting a request for anomaly detection to the detecting means, and a step of the detecting means, when some sort of anomaly is detected, storing the detected anomaly in a database, without replying that an anomaly was detected to the instructing means in response to the request for anomaly detection.

Effects of the Invention

According to the present technology, a phenomenon occurring in a control target can be monitored in a shorter cycle.

BRIEF DESCRIPTION OF THE DRAWINGS

FIG. 8 is an example of a list showing feature amounts that are determinable in a data mining process of the control system according to the embodiment.

EMBODIMENTS OF THE INVENTION

Figure 1:
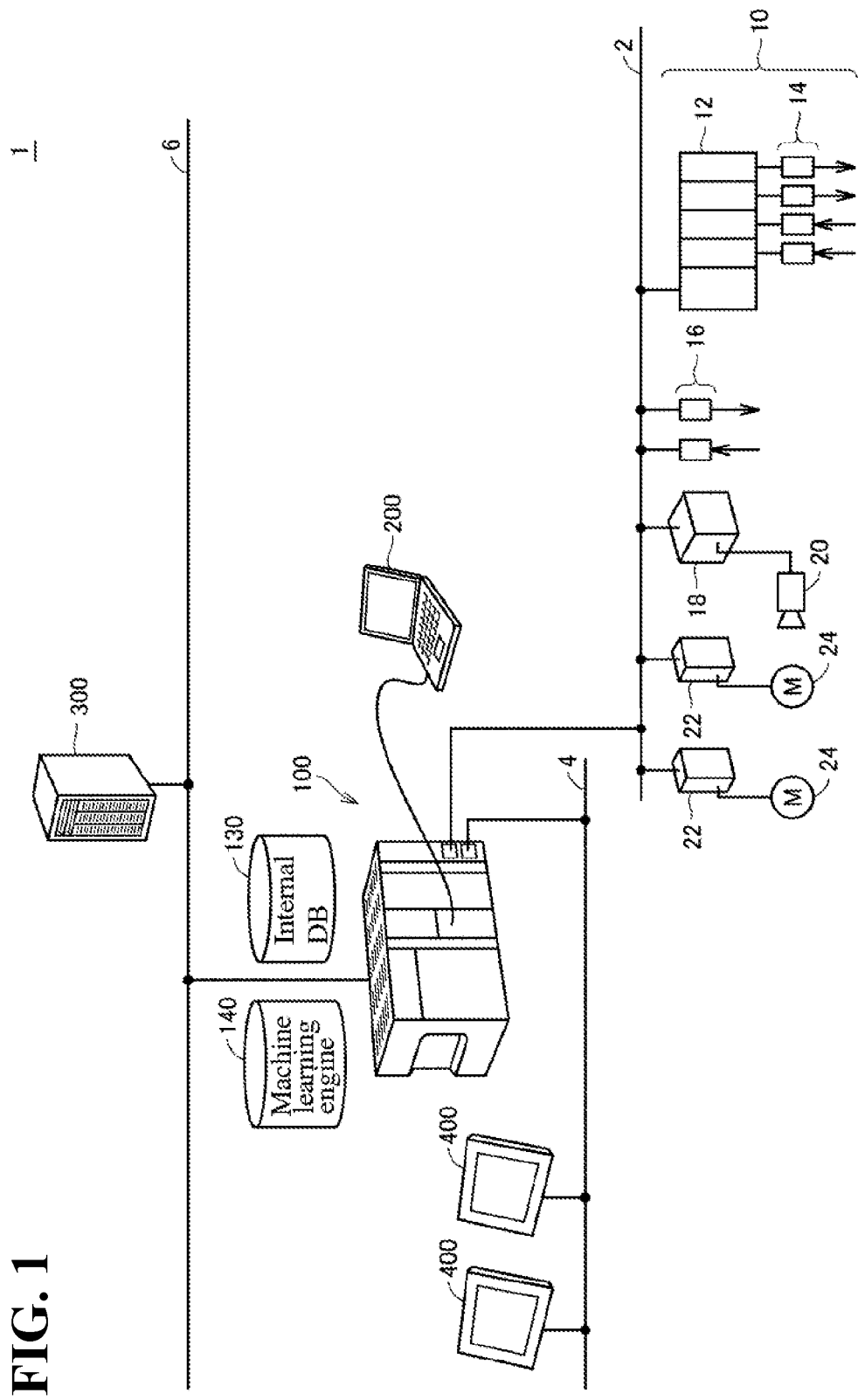
FIG. 1 is a schematic diagram showing an exemplary overall configuration of a control system according to an embodiment.

Embodiments of the present invention will be described in detail, with reference to the drawings. Note that the same or equivalent portions in the diagrams are given the same reference numerals and description thereof will not be repeated.

A. Exemplary Overall Configuration of Control System

First, an exemplary overall configuration of a control system 1 including a control device according to the present embodiment will be described.

FIG. 1 is a schematic diagram showing an exemplary overall configuration of the control system 1 according to the present embodiment. Referring to FIG. 1, the control system 1 according to the present embodiment includes, as main constituent elements, a control device 100 that controls a control target and a support device 200 that is connected to the control device 100.

The control device 100 may be embodied as a type of computer such as a PLC (programmable controller). The control device 100 is connected to a field device group 10 via a first field network 2, and is connected to one or a plurality of display devices 400 via a second field network 4. Furthermore, the control device 100 is connected to a data logging device 300 via a local network 6. The control device 100 exchanges data with connected devices via the respective networks. Note that the data logging device 300 and the display device 400 are optional and are not an essential part of the configuration of the control system 1.

The control device 100 has a control logic (hereinafter also referred to as a "PLC engine") that executes various computations for controlling equipment and machinery. In addition to the PLC engine, the control device 100 has a collection function of collecting data (hereinafter also referred to as "input data") that is measured by the field device group 10 and transferred to the control device 100. Furthermore, the control device 100 also has a monitoring function of monitoring collected input data. By these functions being implemented in the control device 100, a phenomenon occurring in the control target can be monitored in a shorter cycle.

Specifically, an internal database (hereinafter also referred to as an "internal DB") 130 that is implemented in the control device 100 provides the collection function, and a machine learning engine 140 that is implemented in the control device 100 provides the monitoring function. The internal DB 130 and the machine learning engine 140 will be described in detail later.

Networks that perform periodic communication, with which the data arrival time is guaranteed, are preferably employed for the first field network 2 and the second field network 4. As such networks that perform periodic communication, EtherCAT (registered trademark), EtherNet/IP (registered trademark), DeviceNet (registered trademark), CompoNet (registered trademark) and the like are known.

The field device group 10 includes a device that collects input data from a manufacturing device, a production line or the like (hereinafter also referred to collectively as the "field") that relates to the control target or control. An input relay, various sensors or the like are envisaged as such a device that collects input data. The field device group 10 further includes a device that imparts some sort of action to the field, based on commands (hereinafter also referred to as "output data") that are generated by the control device 100. As such a device that imparts some sort of action to the field, an output relay, a contactor, a servo driver and servo motor, or any suitable actuator is envisaged. This field device group 10 exchanges data including input data and output data with the control device 100, via the first field network 2.

In the exemplary configuration shown in FIG. 1, the field device group 10 includes a remote I/O (Input/Output) device 12, a relay group 14, an image sensor 18 and camera 20, and a servo driver 22 and servo motor 24.

The remote I/O device 12 includes a communication unit that communicates via the first field network 2, and an input/output unit (hereinafter also referred to as an "I/O unit") for performing acquisition of input data and output of output data. Input data and output data are exchanged between the control device 100 and the field, via such an I/O unit. An example in which digital signals are exchanged as input data and output data, via the relay group 14, is shown in FIG. 1.

The I/O unit may be configured to be directly connected to the field network. An example in which an I/O unit 16 is directly connected to the first field network 2 is shown in FIG. 1.

The image sensor 18 performs image measurement processing such as pattern matching on image data captured by the camera 20, and transmits the processing result thereof to the control device 100.

The servo driver 22 drives the servo motor 24, in accordance with output data (e.g., position commands, etc.) from the control device 100.

As mentioned above, data is exchanged between the control device 100 and the field device group 10, via the first field network 2, with the data that is exchanged being updated in an extremely short cycle in the order of hundreds of milliseconds to tens of microseconds. Note that the update processing of such data that is exchanged may also be referred to as "I/O refresh processing".

Also, the display device 400 that is connected to the control device 100 via the second field network 4, in response to operations by a user, transmits commands or the like that depend on the user operations to the control device 100, and graphically displays computation results of the control device 100, and the like.

The data logging device 300 is connected to the control device 100 via the local network 6, and exchanges required data with the control device 100. The data logging device 300 has a database function, and performs time-series collection of event logs that are generated by the control device 100, and the like, for example. A general-purpose protocol such as Ethernet (registered trademark) may be implemented in the local network 6. That is, typically, it is acceptable for the data transmission cycle or update cycle in the local network 6 to be slower than the data transmission cycle or update cycle in the field networks (first field network 2 and second field network 4). The local network 6 may, however, be configured to be able to transmit more data at one time compared with the field networks.

The support device 200 is a device that supports preparation required in order for the control device 100 to control the control target. Specifically, the support device 200 is provided with a function of transmitting the development environment (programming and editing tool, purser, compiler, etc.) of programs that are executed by the control device 100, the setting environment for setting parameters (configuration) of the control device 100 and the various devices that are connected to the control device 100 and generated user programs to the control device 100, a function of performing online correction and modification of data such as user programs that are executed on the control device 100, and the like.

Furthermore, the support device 200 according to the present embodiment has a function of perform setting operations on the internal DB 130 and the machine learning engine 140 that are implemented in the control device 100. These functions will be described in detail later.

B. Exemplary Hardware Configurations of Devices

Next, exemplary hardware configurations of the main devices constituting the control system 1 according to the present embodiment will be described.

b1: Exemplary Hardware Configuration of Control Device 100

Figure 2:
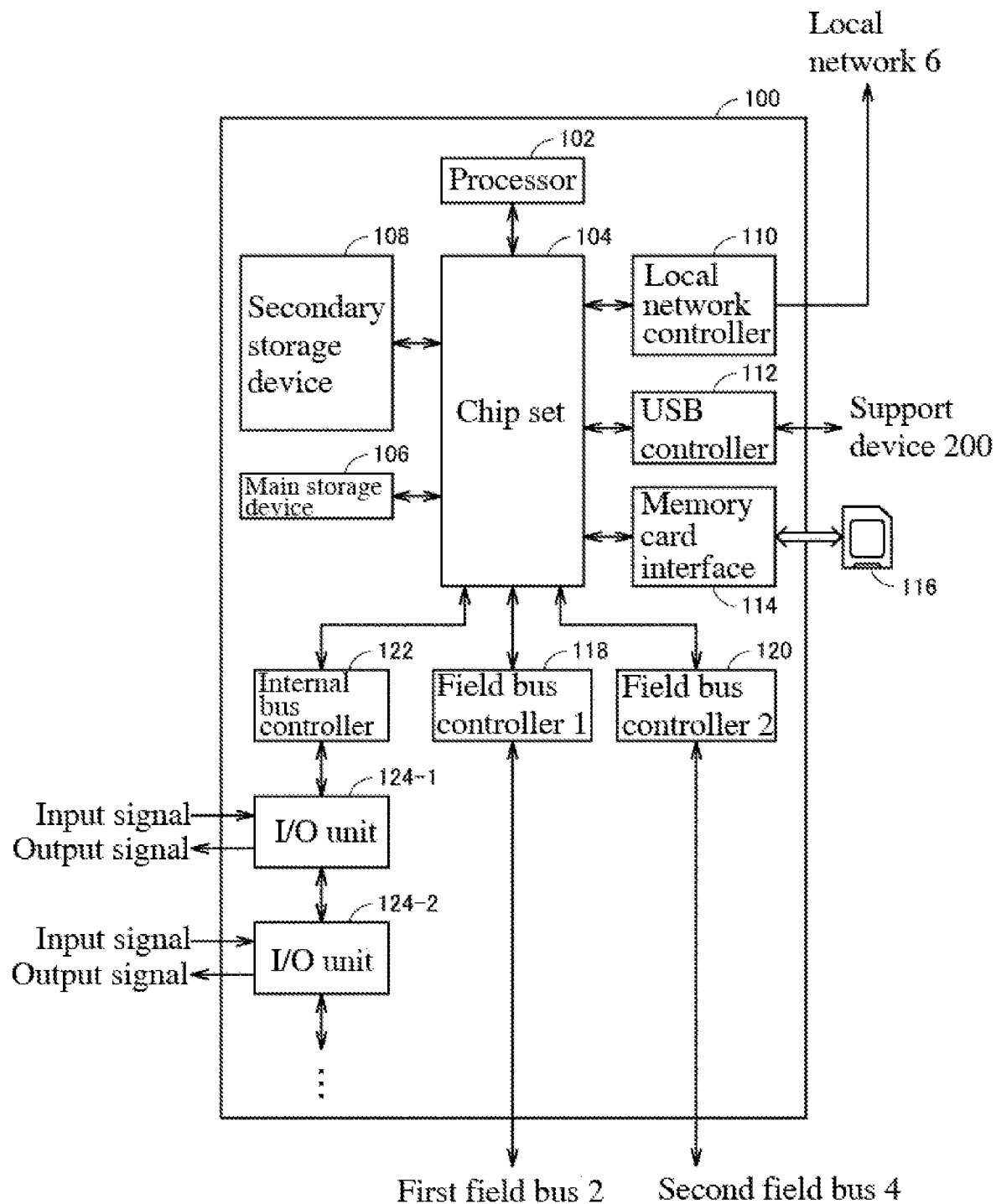
FIG. 2 is a block diagram showing an exemplary hardware configuration of a control device constituting the control system according to the embodiment.

FIG. 2 is a block diagram showing an exemplary hardware configuration of the control device 100 constituting the control system 1 according to the present embodiment. Referring to FIG. 2, the control device 100 includes a processor 102 such as a CPU (Central Processing Unit) or an MPU (Micro-Processing Unit), a chip set 104, a main storage device 106, a secondary storage device 108, a local network controller 110, a USB (Universal Serial Bus) controller 112, a memory card interface 114, an internal bus controller 122, field bus controllers 118 and 120, and I/O units 124-1, 124-2 and so on.

The processor 102 reads out various programs stored in the secondary storage device 108, and realizes control that depends on the control target and various processing such as will be described later, by decompressing and executing the read programs in the main storage device 106. The chip set 104 realizes the processing of the control device 100 as a whole, by controlling the processor 102 and various components.

The secondary storage device 108 stores user programs that are executed utilizing the PLC engine, in addition to system programs for realizing the PLC engine. Furthermore, the secondary storage device 108 also stores programs for realizing the internal DB 130 and the machine learning engine 140.

The local network controller 110 controls the exchange of data with other devices performed via the local network 6. The USB controller 112 controls the exchange of data with the support device 200 via USB connection.

The memory card interface 114 is constituted such that a memory card 116 is insertable and removable, and is capable of writing data to the memory card 116 and reading out various data (user programs, trace data, etc.) from the memory card 116.

The internal bus controller 122 is an interface that exchanges data with the I/O units 124-1, 124-2 and so on mounted in the control device 100.

The field bus controller 118 controls the exchange of data with other devices performed via the first field network 2. Similarly, the field bus controller 120 controls the exchange of data with other devices performed via the second field network 4.

FIG. 2 shows an exemplary configuration in which required functions are provided by the processor 102 executing programs, but some or all of these functions that are provided may be implemented using a dedicated hardware circuit (e.g., ASIC (Application Specific Integrated Circuit), FPGA (Field-Programmable Gate Array), etc.). Alternatively, the principal part of the control device 100 may be realized using hardware (e.g., industrial personal computer based around a general-purpose personal computer) that conforms to general-purpose architecture. In this case, a configuration may be adopted in which a plurality of OSs (Operating Systems) having different use applications are executed in parallel using virtualization technology, and required applications are executed on the respective OSs.

b2: Exemplary Hardware Configuration of Support Device 200

Next, the support device 200 according to the present embodiment is, as one example, realized by executing a program using hardware (e.g., general-purpose personal computer) that conforms to general-purpose architecture.

Figure 3:
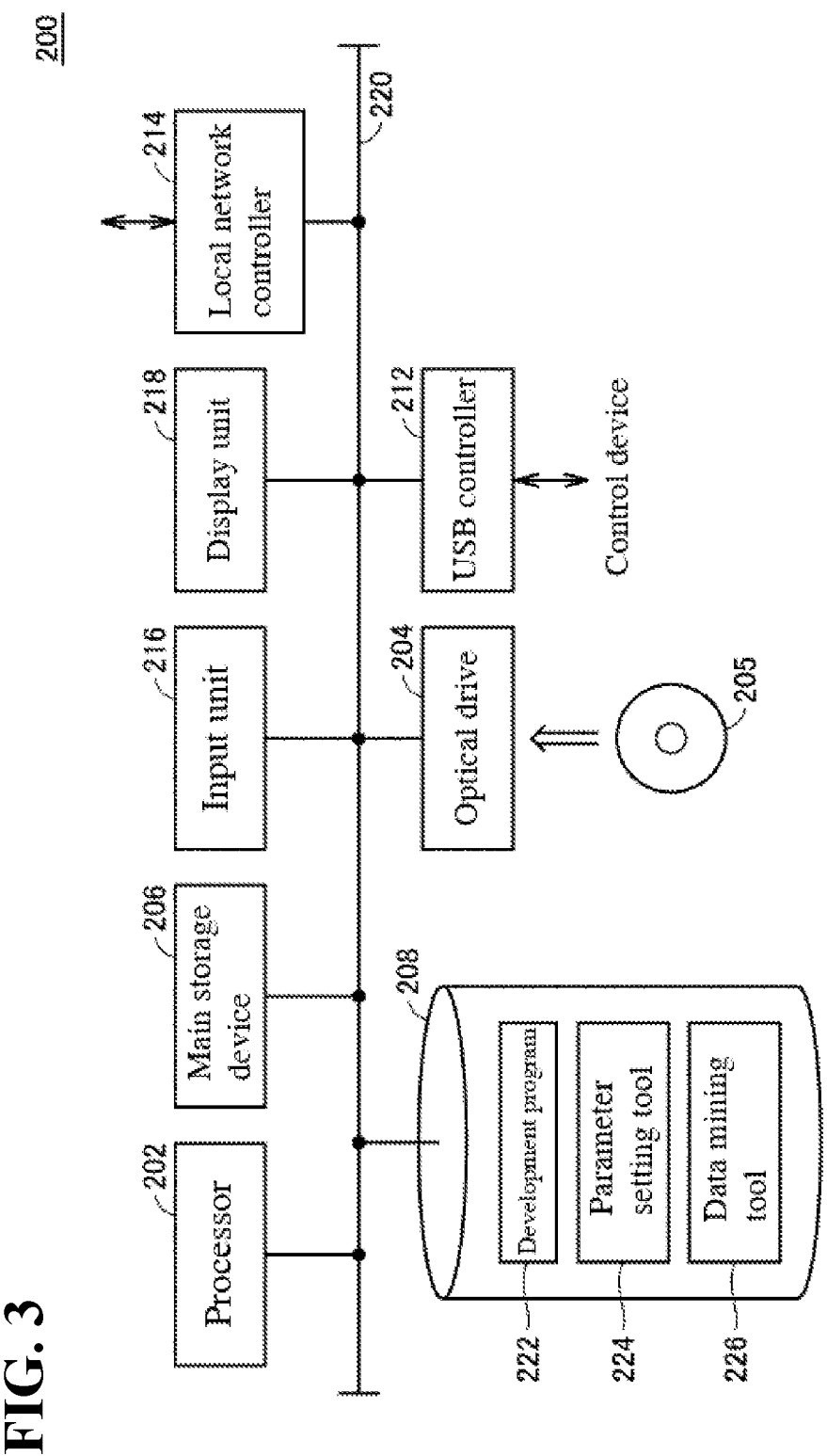
FIG. 3 is a block diagram showing an exemplary hardware configuration of a support device constituting the control system according to the embodiment.

FIG. 3 is a block diagram showing an exemplary hardware configuration of the support device 200 constituting the control system 1 according to the present embodiment. Referring to FIG. 3, the support device 200 includes a processor 202 such as a CPU or an MPU, an optical drive 204, a main storage device 206, a secondary storage device 208, a USB controller 212, a local network controller 214, an input unit 216, and a display unit 218. These components are connected via a bus 220.

The processor 202 reads out various programs stored in the secondary storage device 208, and realizes various processing which will be described later, by decompressing and executing the read programs in the main storage device 206.

The secondary storage device 208 is constituted by an HDD (Hard Disk Drive), an SSD (Flash Solid State Drive) or the like, for example. The secondary storage device 208, typically, stores a development program 222 for creating user programs that are executed in the support device 200, debugging created programs, defining the system configuration, setting various parameters, and the like, a parameter setting tool 224 for designating variables to be targeted for machine learning, and a data mining tool 226 for extracting desired information from data that is collected by the control device 100. The secondary storage device 208 may also store an OS and other required programs.

The support device 200 has an optical drive 204, and programs are read from a computer-readable recording medium 205 (e.g., optical recording medium such as a DVD (Digital Versatile Disc)) that stores programs in a non-transient manner and installed on the secondary storage device 208 or the like.

Various programs that are executed by the support device 200 are installed via the computer-readable recording medium 205, but a configuration may be adopted in which the programs are installed by being downloaded from a server device on a network, or the like. There are also cases where the functions that are provided by the support device 200 according to the present embodiment are realized by utilizing some of the modules that are provided by the OS.

The USB controller 212 controls the exchange of data with the control device 100 via USB connection. The local network controller 214 controls the exchange of data with other devices performed via any suitable network.

The input unit 216 is constituted by a keyboard, a mouse and the like, and accepts user operations. The display unit 218 is constituted by a display, various indicators, a printer and the like, and outputs processing results from the processor 202, and the like.

FIG. 3 shows an exemplary configuration in which required functions are provided by the processor 202 executing programs, but some or all of these functions that are provided may be implemented using a dedicated hardware circuit (e.g., ASIC, FPGA, etc.).

b3: Exemplary Hardware Configuration of Data Logging Device 300

Next, the data logging device 300 constituting the control system 1 according to the present embodiment can, as one example, be realized using a general-purpose file server or database server. The hardware configuration of such a device is well-known, and thus will not be described in detail here.

b4: Exemplary Hardware Configuration of Display Device 400

Next, the display device 400 constituting the control system 1 according to the present embodiment is called an HMI (Human Machine Interface) device, and may be configured to be implemented as a dedicated device, or may be realized using hardware (e.g., industrial personal computer based around a general-purpose personal computer) that conforms to general-purpose architecture.

C. Anomaly Detection Function Provided by Control System

Next, an anomaly detection function that is provided by the control system 1 according to the present embodiment will be described.

Figure 4:
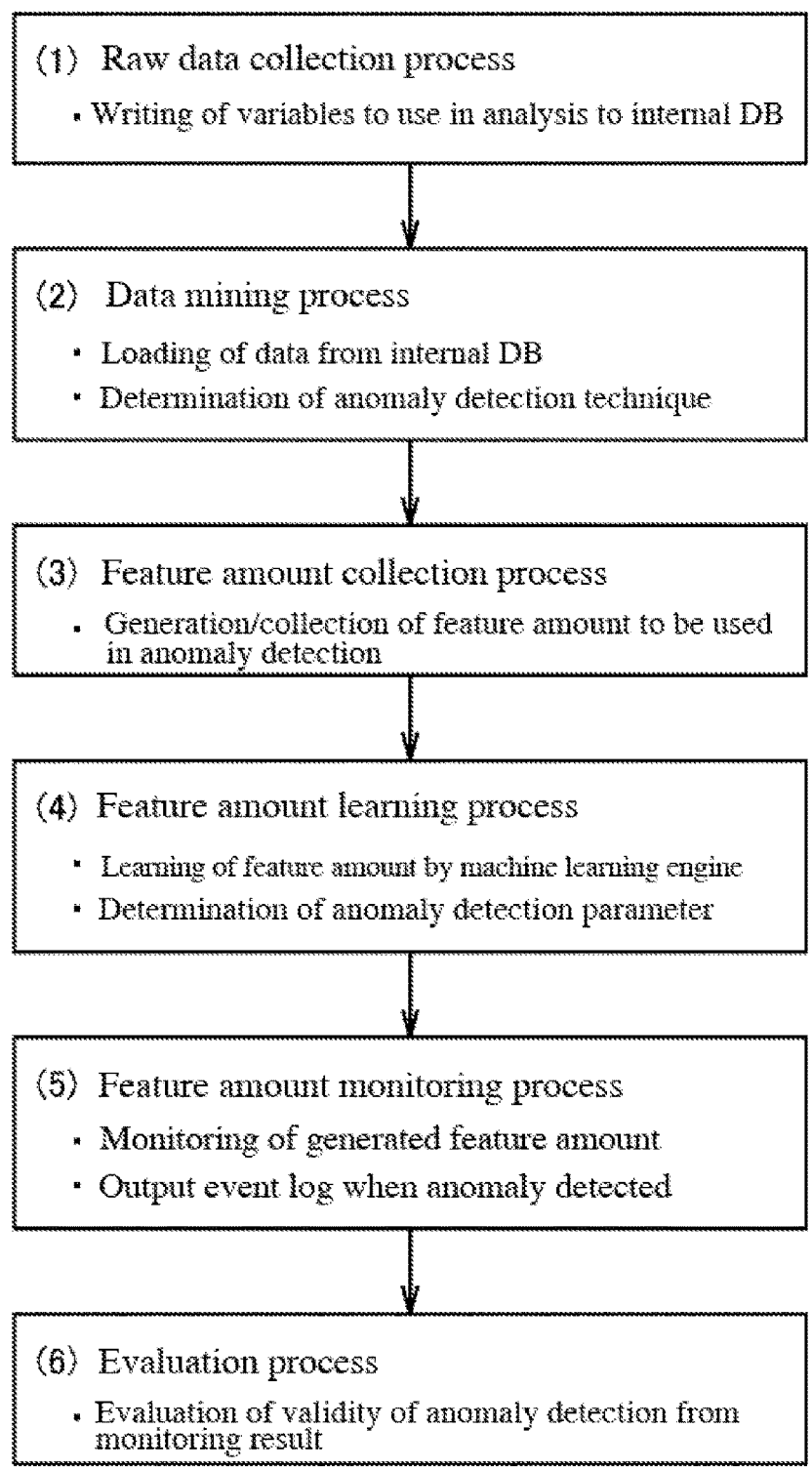
FIG. 4 is a schematic diagram for illustrating a procedure of anomaly detection that uses the control system according to the embodiment.

FIG. 4 is a schematic diagram for illustrating the procedure of anomaly detection that uses the control system 1 according to the present embodiment. The procedure of anomaly detection shown in FIG. 4 consists of six processes as a whole.

Specifically, first, a raw data collection process (1) is implemented. In the raw data collection process (1), data that is used in analysis related to anomaly detection, out of the data that is handled by the control device 100, is written to the internal DB 130. The raw data collection process (1) is realized by an internal DB writing program of the control device 100, which will be described later, being executed.

In the control device 100, unique variable names are allocated to data (input data and output data) that is exchanged with the field and to internal data, and user programs and the like are written utilizing these variable names. That is, an environment that enables variable programming is provided in the control device 100. Thus, in the following description, the expressions "designation of a variable" and "specification of a variable" are used substantially synonymously to mean specifying data to be targeted. Note that the scope of the present invention is not limited to a configuration that enables variable programming, and even a configuration that directly designates addresses in memory can be encompassed in the technical scope.

Next, a data mining process (2) is implemented. In the data mining process (2), data written in the internal DB 130 is loaded and an anomaly detection technique is determined. The anomaly detection technique refers to a technique for determining what kind of data monitored with what kind of logic will enable the desired anomaly to be detected. In the present embodiment, the anomaly detection technique includes a technique for generating a feature amount from one or a plurality of data from the field. The data mining process (2) is, typically, realized by a data mining tool of the support device 200, which will be described later, being executed. Settings, parameters and the like for generating the feature amount are output, according to the determined anomaly detection technique.

Next, a feature amount collection process (3) is implemented. In the feature amount collection process (3), the feature amount is sequentially generated, by the technique for generating the feature amount determined in the previous data mining process (2) being applied to the data to be targeted, out of data that is exchanged with the field and internal data. The feature amount collection process (3) is realized by a feature amount generation program of the control device 100, which will be described later, being executed.

Next, a feature amount learning process (4) is implemented. In the feature amount learning process (4), machine learning processing is implemented on the feature amount collected in the feature amount collection process (3), and an anomaly detection parameter (typically, a threshold, etc.) that is used in anomaly detection is determined from the result of this machine learning processing. The feature amount learning process (4) is provided by a machine learning engine of the control device 100, which will be described later.

The definition of the feature amount that is used in anomaly detection, the anomaly detection parameter for judging that an anomaly has occurred, and the like, can be determined by processes such as the above (1) to (4). A process of monitoring whether or not an anomaly has occurred is then implemented. Specifically, a feature amount monitoring process (5) is implemented. In the feature amount monitoring process (5), the feature amount generated every predetermined cycle or every predetermined event is monitored, that is, it is judged whether the feature amount that is generated meets a condition prescribed by the anomaly detection parameter determined in advance. When an anomaly is detected, an event log indicating the detected anomaly is output.

In the case where some sort of anomaly is detected in the feature amount monitoring process (5), a process of evaluating the validity of the anomaly may be implemented. That is, an evaluation process (6) may be implemented, in response to detection of some sort of anomaly. In the evaluation process (6), the validity of the detected anomaly is evaluated, based on the anomaly detection result. The evaluation process (6) is, typically, realized by the data mining tool of the support device 200, which will be described later, being executed. The anomaly detection parameter and the like that are used in anomaly detection may be adjusted, according to a result of the evaluation in the evaluation process (6).

Figure 5:
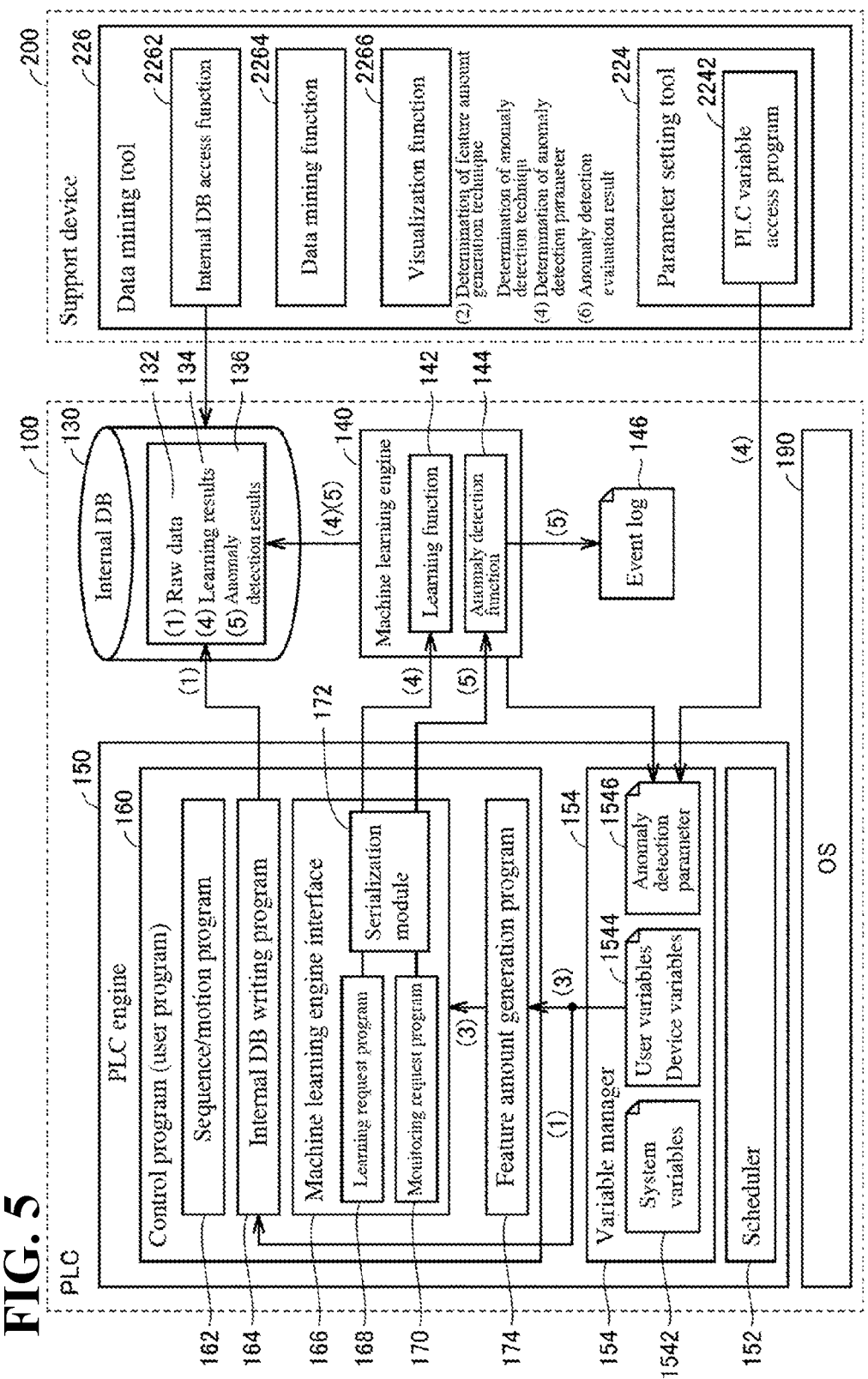
FIG. 5 is a schematic diagram for illustrating functions provided by the respective devices of the control system according to the embodiment.

FIG. 5 is a schematic diagram for illustrating the functions that are provided by the respective devices of the control system 1 according to the present embodiment. In the schematic diagram shown in FIG. 5, the numbers in the parentheses correspond to processing in the processes (1) to (6) shown in FIG. 5.

The control device 100 has a PLC engine 150, in addition to the internal DB 130 and the machine learning engine 140. These functions are, basically, realized by the processor 102 (FIG. 2) of the control device 100 executing programs. The OS 190 is also installed on the control device 100, in order to provide an environment for this processor 102 to execute programs.

The PLC engine 150 is, typically, provided by a system program and a user program being executed on the OS 190. In other words, according to one aspect of the present invention, programs such as for realizing the control device 100 including the PLC engine 150, by being executing by some type of computer, can be included.

More specifically, the PLC engine 150 includes a scheduler 152, a variable manager 154, and a control program 160.

The scheduler 152 controls the execution timing, execution sequence and the like of the respective programs (or tasks corresponding thereto) constituting the PLC engine 150. The execution cycle is determined in advance for the tasks that are included in the PLC engine 150, and the scheduler 152 performs control so as to be able to repeatedly execute the tasks in accordance with the predetermined execution cycle.

The variable manager 154 manages, as variables, data updated by I/O refresh processing that is cyclically executed in the PLC engine 150. More specifically, the variable manager 154 holds and manages system variables 1542 that include data sets indicating the operating states of the various parts of the control device 100, user variables/device variables 1544 that include data sets that are written and read out by user programs that are executed in the PLC engine 150, and an anomaly detection parameter 1546 that is used in anomaly detection.

The anomaly detection parameter 1546 can be accessed and updated by a PLC variable access program 2242 of the support device 200. In other words, the variable manager 154 provides a function of holding the anomaly detection parameter 1546, and, in response to a request from an external device, updating the anomaly detection parameter 1546 that is held.

The control program 160 corresponds to a user program that is suitably created by a user, and, typically, includes a sequence/motion program 162, an internal DB writing program 164, a machine learning engine interface 166, and a feature amount generation program 174. Commands of the programs constituting the control program 160 may be written as one program, or may be written separately as a plurality of programs.

The sequence/motion program 162 includes commands for performing logical operations and/or arithmetic operations for controlling the control target. The internal DB writing program 164 writes variables designated in advance, out of the variables that are included in the user variables/device variables 1544, to the internal DB 130.

The machine learning engine interface 166 includes commands for operating the machine learning engine 140. Specifically, the machine learning engine interface 166 includes a learning request program 168, a monitoring request program 170, and a serialization module 172.

In other words, the learning request program 168 includes commands that instruct the machine learning engine 140 to perform machine learning, and the monitoring request program 170 includes commands that instruct the machine learning engine 140 to perform monitoring of the feature amount and anomaly detection using the anomaly detection parameter 1546.

The serialization module 172 executes serialization processing for reducing the amount of communication that the learning request program 168 and the monitoring request program 170 perform with the machine learning engine 140. As will be described later, the serialization module 172 provides a data compression function for data-compressing the feature amount that is generated by execution of the feature amount generation program 174, and providing the data-compressed feature amount to a learning function 142 and an anomaly detection function 144.

The feature amount generation program 174 includes commands for generating a feature amount using designated variables of the user variables/device variables 1544, in accordance with a feature amount generation technique designated in advance. An appropriate feature amount generation technique is determined according to the control target as will be described later. That is, the feature amount generation program 174 generates a feature amount suitable for detecting an anomaly that occurs in the control target from data that relates to the control target.

The internal DB 130, typically, stores raw data 132 that is collected in the raw data collection process (1), learning results 134 that are acquired in the feature amount learning process (4), and anomaly detection results 136 that are output in the feature amount monitoring process (5).

The machine learning engine 140 includes the learning function 142 which is for executing required processing in the feature amount learning process (4), and the anomaly detection function 144 which is for executing required processing in the feature amount monitoring process (5). The learning function 142 carries out machine learning using the feature amount that is generated by execution of the feature amount generation program 174. The anomaly detection function 144 detects anomalies in the control target, based on the anomaly detection parameter 1546 determined based on the learning results of machine learning by the learning function 142 and used in detecting anomalies that occur in the control target and the feature amount generated by execution of the feature amount generation program 174. The anomaly detection function 144, upon detecting some sort of anomaly, outputs an event log 146 showing the contents of the detected anomaly. The anomaly detection function 144 operates in accordance with a request from the monitoring request program 170. In other words, the monitoring request program 170 instructs the anomaly detection function 144 to perform anomaly detection.

On the other hand, the parameter setting tool 224 and the data mining tool 226 are installed in the support device 200, in addition to the development program 222 (FIG. 3).

The parameter setting tool 224 includes a PLC variable access program 2242 for accessing variables that are managed by the variable manager 154 of the control device 100. The PLC variable access program 2242 enables reference and rewriting of variables within the control device 100.

The data mining tool 226 includes an internal DB access function 2262, a data mining function 2264, and a visualization function 2266. The internal DB access function 2262 accesses the internal DB 130, and extracts required data, out of the raw data that is collected in the internal DB 130. The data mining function 2264 mainly carries out the above-mentioned data mining process (2). The visualization function 2266 visually presents various types of information obtained by the data mining process (2) and the like, the contents of anomalies detected in the feature amount monitoring process (5), and the like, to the user.

According to the data mining tool 226, the feature amount generation technique and the anomaly detection technique are determined, through implementation of the data mining process (2), the anomaly detection parameter is determined, through implementation of the feature amount learning process (4), and the evaluation result of anomaly detection is generated, through implementation of the evaluation process (6).

Figure 6:
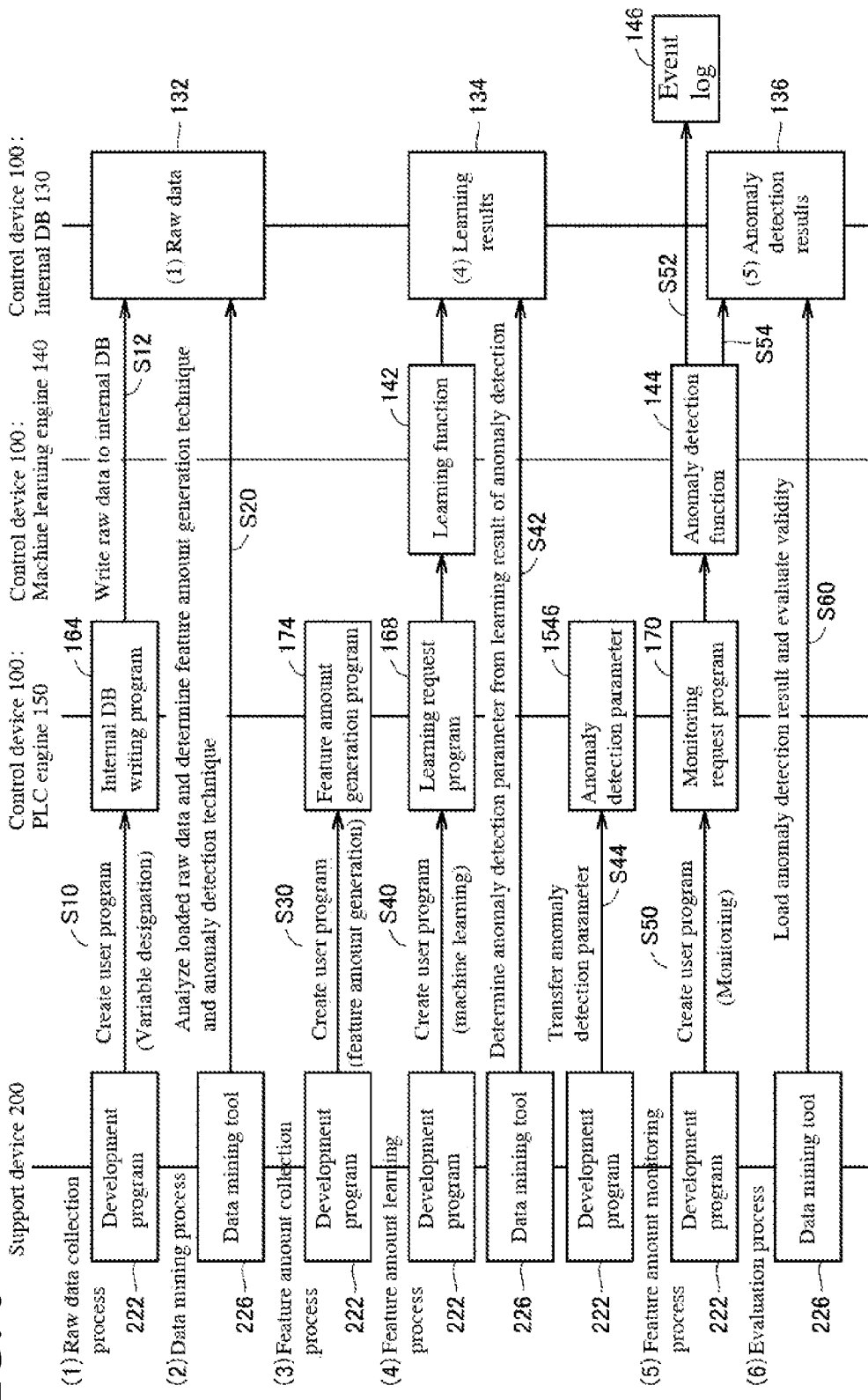
FIG. 6 is a schematic diagram for illustrating the contents of processing in respective processes for anomaly detection that uses the control system according to the embodiment.

Next, the relationship between the processes shown in (1) to (6) and the operations of the elements shown in FIG. 5 will be described. FIG. 6 is a schematic diagram for illustrating the processing contents of the processes for anomaly detection that uses the control system 1 according to the present embodiment.

Referring to FIG. 6, in the raw data collection process (1), the user operates the development program 222 of the support device 200 to create a user program for designating variables to be collected in the internal DB 130 (step S10). This created user program corresponds to the internal DB writing program 164. By the internal DB writing program 164 being executed by the PLC engine 150 of the control device 100, raw data 132 is written to the internal DB 130 of the control device 100 (step S12).

In the data mining process (2), the user operates the data mining tool 226 of the support device 200 to determine the feature amount generation technique and the anomaly detection technique, by the raw data 132 that is collected in the internal DB 130 being read out and analyzed (step S20).

In the feature amount collection process (3), the user operates the development program 222 of the support device 200 to create a user program related to feature amount generation in which the feature amount generation technique determined in the data mining process (2) is reflected (step S30). This created user program corresponds to the feature amount generation program 174.

In the feature amount learning process (4), the user operates the development program 222 of the support device 200 to create a user program for designating machine learning that uses a feature amount (step S40). This created user program corresponds to the learning request program 168. By the learning request program 168 being executed by the machine learning engine interface 166 of the PLC engine 150 of the control device 100, the learning function 142 of the machine learning engine 140 of the control device 100 carries out machine learning, and the learning results 134 thereof are stored in the internal DB 130. Note that a configuration may be adopted in which the feature amount generation program 174 of the feature amount collection process (3) and the learning request program 168 of the feature amount learning process (4) are executed at the same time.

The user then operates the data mining tool 226 of the support device 200 to determine the anomaly detection parameter, by the learning results 134 that are stored in the internal DB 130 being read out and analyzed (step S42). Next, the user operates the development program 222 of the support device 200 to transfer the determined anomaly detection parameter to the PLC engine 150 of the control device 100 (step S44).

In the feature amount monitoring process (5), the user operates the development program 222 of the support device 200 to create a user program for monitoring the occurrence of some sort of anomaly (step S50). This created user program corresponds to the monitoring request program 170. By the monitoring request program 170 being executed by the machine learning engine interface 166 of the PLC engine 150 of the control device 100, the anomaly detection function 144 of the machine learning engine 140 of the control device 100 carries out anomaly detection processing, and, upon detecting some sort of anomaly, outputs an event log 146 that includes the contents thereof (step S52), and writes the anomaly detection result 136 to the internal DB 130 (step S54).

In the evaluation process (6), the user operates the development program 222 of the support device 200 to read out the anomaly detection result 136 stored in the internal DB 130 and evaluate the validity of the contents thereof (step S60). If necessary, the user may adjust the anomaly detection parameter 1546.

The anomaly detection function according to the present embodiment is realized by elements of the control device 100 and the support device 200 such as described above being interconnected.

D. Raw Data Collection Process

Next, the user program (internal DB writing program 164) that is generated in the raw data collection process (1) will be described.

Figure 7:
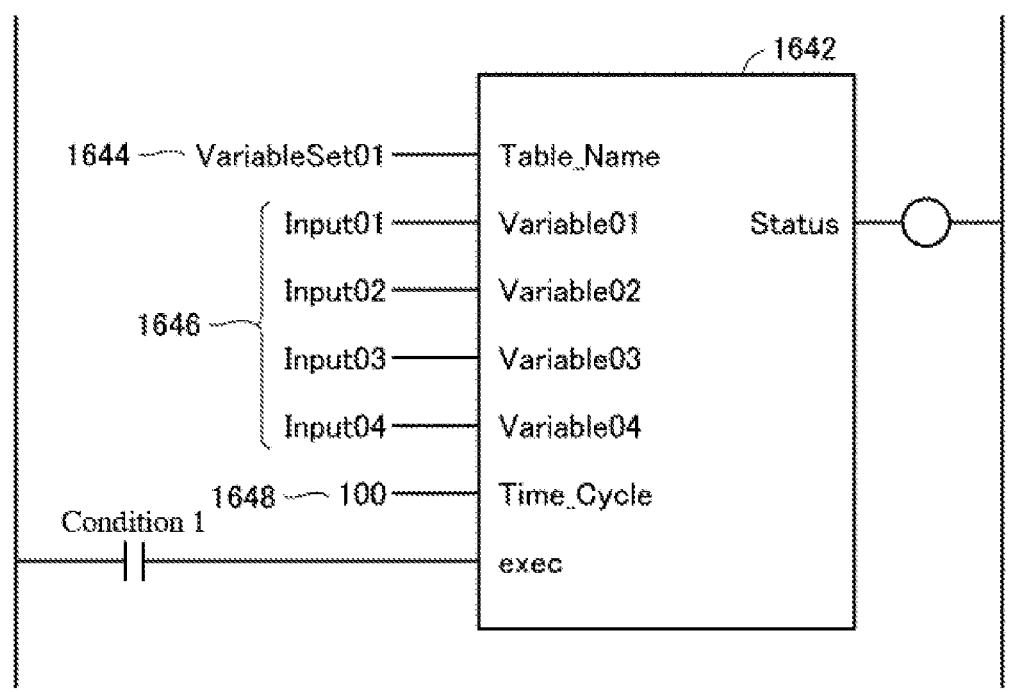
FIG. 7 is a diagram showing an example of an internal DB writing program that is generated in the control system according to the embodiment.

FIG. 7 is a diagram showing an example of the internal DB writing program 164 that is generated in the control system 1 according to the present embodiment. With reference to FIG. 7, the internal DB writing program 164, typically, may be written using an internal DB write function block 1642.

A table name 1644 for specifying a set of raw data that is collected in the internal DB 130, a target variable designation 1646 that designates variables that are collected in the internal DB 130, and a cycle designation 1648 that designates the cycle for collecting variables in the internal DB 130 are defined with respect to the internal DB write function block 1642.

The user designates a suitable name as the table name 1644, and designates variable names indicating variables to be targeted, as the target variable designation 1646. Also, the collection cycle (collection frequency) of variables to be targeted is designated as the cycle designation 1648. In the example shown in FIG. 7, four variables (Input01 to Input04) are collected in a table given the name "VariableSet01" in a cycle of 100 msec. Note that a condition for effectively operating the internal DB write function block 1642 may be designated.

Note that the user program shown in FIG. 7 is an example, and any description method may be employed. For example, ladder language or structured text may be used.

In this way, the control device 100 has the internal DB 130 as a database for collecting and storing data that relates to the control target. Data designated in accordance with commands (e.g., internal DB write function block 1642) that are included in user programs will then be collected in the internal DB 130.

In the control system 1 according to the present embodiment, by the user simply writing a user program such as described above (internal DB writing program 164), the time series of one or a plurality of required variables can be collected in the control cycle (in the order of hundreds of milliseconds to tens of microseconds) of the control device 100, and finer analysis becomes possible, as compared with existing systems.

E. Data Mining Process

Next, an example of the feature amount generation technique and the anomaly detection technique that are determined in the data mining process (2) will be described.

FIG. 8 is an example of a list showing feature amounts that are determinable in the data mining process of the control system 1 according to the present embodiment. A plurality of feature amounts such as shown in FIG. 8 are defined in advance, and, in the data mining process, it is determined which of the feature amounts to preferably use with respect to the raw data that is collected in the internal DB 130.

Specifically, each of the feature amounts shown in FIG. 8 is calculated using the raw data collected in the internal DB 130, and feature amounts that exhibit a high degree of change are determined as candidates.

Alternatively, as a typical technique, various types of principal component analysis may be employed. Any well-known method can be employed as the principal component analysis technique.

Figure 9:
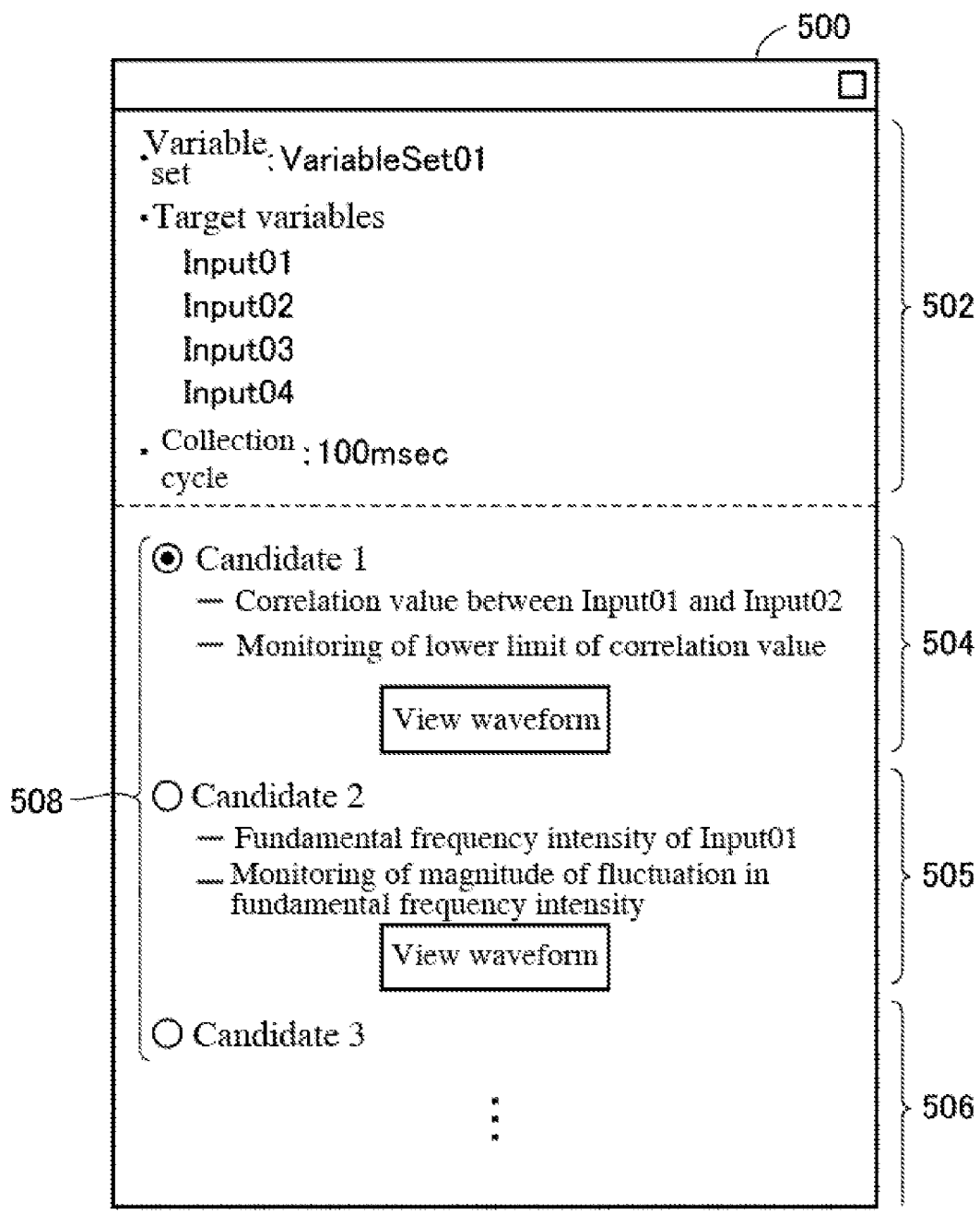
FIG. 9 is a diagram showing an example of a user interface screen that is displayed after the data mining process in the support device according to the embodiment.

FIG. 9 is a diagram showing an example of a user interface screen that is displayed after the data mining process in the support device 200 according to the present embodiment. Referring to FIG. 9, specific information 502 for specifying a raw data set to be targeted in the data mining process, and candidates (candidates 504 to 506) for the feature amount generation technique and the anomaly detection technique, derived through implementation of the data mining process, are displayed on a user interface screen 500.

For each of the candidates 504 to 506, a combination of one or a plurality of variables that are used in generation of the feature amount and the type of feature amount that is generated using these variables is displayed, and an algorithm for monitoring the generated feature amount is also displayed. For example, for the candidate 504, the correlation value between the variable Input01 and the variable Input02 is given as a candidate for the feature amount generation technique (i.e., feature amount), and a technique for monitoring the lower limit of this feature amount is further given as a candidate for the anomaly detection technique. This also similarly applies to the other candidates 505 and 506.

Furthermore, for each the candidates 504 to 506, a "view waveform" button is also displayed, and the waveform used when the corresponding candidates for the feature amount generation technique and the anomaly detection technique were determined, and the like, can also be checked by the user selecting this button.

Finally, the feature amount generation technique and the anomaly detection technique are determined, by the user selecting a radio button 508 for the candidate considered to be the most preferable on the user interface screen 500. In this way, by the data mining tool 226 of the support device 200 being executed, a function of determining a feature amount generation technique suitable for detecting anomalies that occur in the control target, based on data collected in the internal DB 130 of the control device 100, is provided.

F. Feature Amount Collection Process and Feature Amount Learning Process

Next, the user programs (feature amount generation program 174 and learning request program 168) that are generated in the feature amount collection process (3) and the feature amount learning process (4) will be described.

Figures 10, 11:
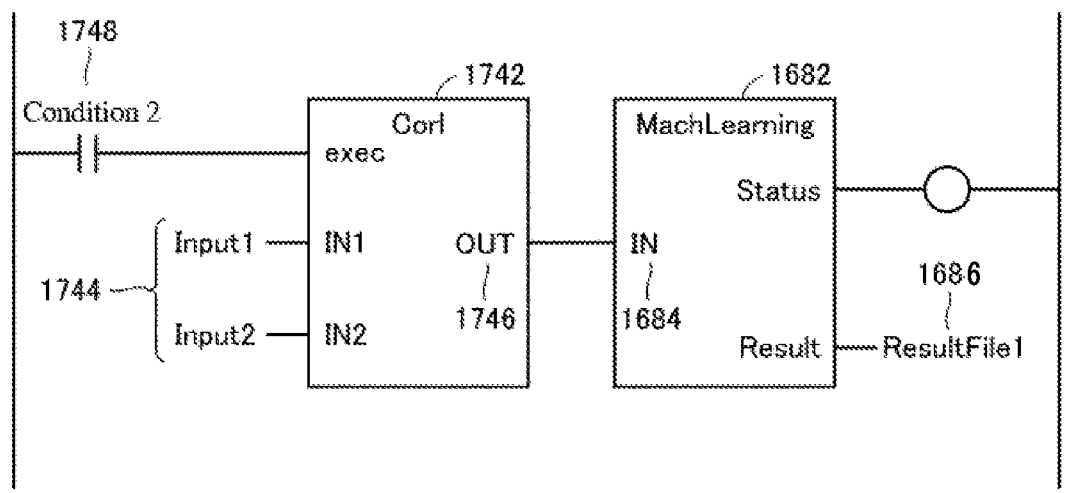
FIG. 10 is a diagram showing an example of a feature amount generation program and a learning request program that are generated in the control system according to the embodiment.
FIG. 11 is a diagram showing an example of learning results obtained by carrying out machine learning that is executed in the control system according to the embodiment.

FIG. 10 is a diagram showing an example of the feature amount generation program 174 and the learning request program 168 that are generated in the control system 1 according to the present embodiment. Referring to FIG. 10, the feature amount generation program 174, typically, may be written using a feature amount generation function block 1742. The feature amount generation function block 1742 is a functional module that calculates a correlation value as the feature amount in correspondence with the first candidate on the user interface screen 500 in FIG. 9.

An input variable designation 1744 that designates variables to be used in calculation of the feature amount, and an output destination designation 1746 that indicates the output destination of the calculated feature amount are defined, with respect to the feature amount generation function block 1742. Note that the feature amount learning process (4) has an object of determining the anomaly detection parameter to be used in anomaly detection, and thus may set a condition 1748 for the feature amount generation function block 1742 to operate effectively. As this condition 1748, a variable indicating a situation in which some sort of anomaly can occur in the equipment or machinery to be monitored is set. For example, a case such as where the temperature of the equipment or machinery to be monitored exceeds a value determined in advance can be set. Alternatively, the equipment or machinery to be monitored actually operating may be set as the condition 1748. By designating such a condition 1748, the data amount of the feature amount that is generated can be reduced, and the efficiency and accuracy of machine learning can be enhanced.

A learning request function block 1682 for executing processing corresponding to the learning request program 168 may be connected to an output stage (output destination designation 1746) of the feature amount generation function block 1742. That is, the output destination designation 1746 of the feature amount generation function block 1742 is connected to an input variable designation 1684 designating a variable to serve as the feature amount to be learned by the learning request function block 1682.

Information (learning results 134) that is obtained as a result of machine learning by the learning request program 168 is output to an output stage (learning result output destination designation 1686) of the learning request function block 1682.

FIG. 11 is a diagram showing an example of learning results obtained by carrying out machine learning that is executed in the control system 1 according to the present embodiment. Referring to FIG. 11, it is assumed, for example, that the set of feature amounts that is calculated is separated into three clusters by clustering. In such a case, as the learning results 134, the data count of the feature amount that is included in each cluster as well as the average value, standard deviation and the like are output along with specification of each cluster.

The user, by referring to learning results 134 such as shown in FIG. 11, is able to infer that the first and third clusters whose correlation value serving as the feature amount is relatively high are in a normal state, and the second cluster whose correlation value serving as the feature amount is relatively low is in an anomalous state. In addition, a threshold value for distinguishing the first and third clusters from the second cluster can be set as the anomaly detection parameter. In this case, a range including fluctuation of the clusters from the average value and the standard deviation of the respective clusters is specified, and the anomaly detection parameter is determined. For example, in the example shown in FIG. 11, the first and second clusters are greatly separated, and thus "47.5" that splits the difference of the average values of the clusters can be set as the anomaly detection parameter.

If the anomaly detection parameter can be set, the feature amount collection process (3) and the feature amount learning process (4) are completed. In this way, by the data mining tool 226 of the support device 200 being executed, the function of determining an anomaly detection parameter 1706 based on the learning results of machine learning is provided.

G. Feature Amount Monitoring Process

Next, the user program (monitoring request program 170) that is generated in the feature amount monitoring process (5) will be described.

Figures 12, 13:
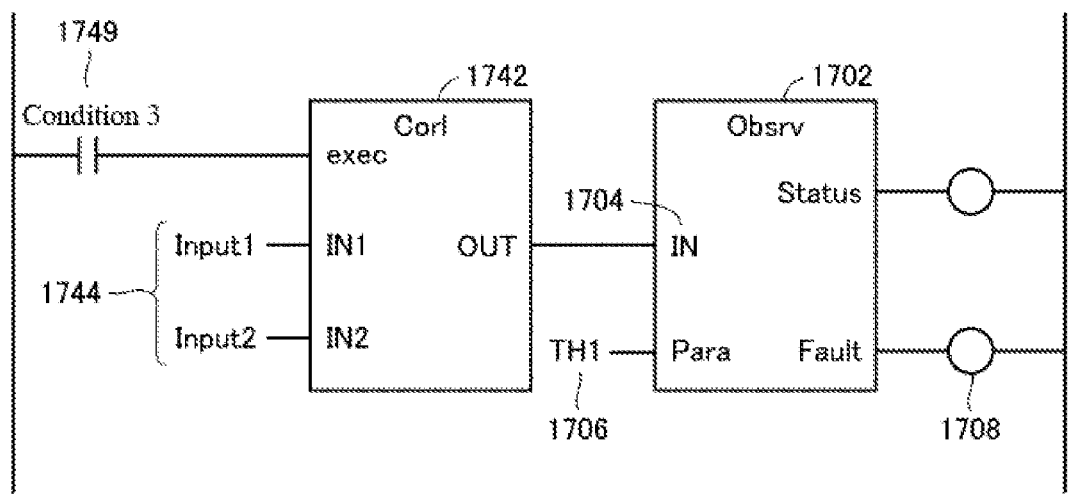
FIG. 12 is a diagram showing an example of a feature amount generation program and a monitoring request program that are generated in the control system according to the embodiment.
FIG. 13 is a schematic diagram for illustrating serialization processing in the control device of the control system according to the embodiment.

FIG. 12 is a diagram showing an example of the feature amount generation program 174 and the monitoring request program 170 that are generated in the control system 1 according to the present embodiment. The feature amount generation program 174 is, similarly to the abovementioned FIG. 10, written using the feature amount generation function block 1742.

A monitoring request function block 1702 for executing processing corresponding to the monitoring request program 170 may be connected to the output stage (output destination designation 1746) of the feature amount generation function block 1742. That is, the output destination designation 1746 of the feature amount generation function block 1742 is connected to an input variable designation 1704 that designates a variable to serve as the feature amount to be monitored by the monitoring request function block 1702. Furthermore, the anomaly detection parameter 1706 that functions as a threshold value of anomaly detection is defined in the monitoring request function block 1702.

The feature amount generation function block 1742 drives the variable (coil) defined as a failure output destination designation 1708 to be ON when an event occurs whereby the variable (feature amount) designated in the input variable designation 1704, upon being compared every control cycle with the threshold value designated in the anomaly detection parameter 1706, straddles the threshold value. With the user program, an anomaly in the equipment or machinery to be controlled can be immediately detected, based on the value of the variable designated as the failure output destination designation 1708.

In this way, the anomaly detection function 144 is realized by a user program (feature amount generation function block 1742) that includes designation of the anomaly detection parameter 1706 and designation of the feature amount to be targeted. Versatility can be enhanced, by being able to stipulate anomaly detection processing using such a function block.

Note that, in the feature amount monitoring process (5), there are also cases where it is preferable to carry out anomaly detection processing in a state where target equipment or machinery is actually operating, in which case, a condition 1749 for the feature amount generation function block 1742 to operate effectively may be set. As this condition 1749, some sort of variable that indicates that the equipment or machinery to be monitored is operating is set. Note that a condition for operating effectively may be set for the monitoring request function block 1702, rather than the feature amount generation function block 1742. By designating such a condition 1749, the possibility of erroneously detecting an anomaly of the target equipment or machinery can be reduced, and the accuracy of anomaly detection can be enhanced.

Anomaly detection on target equipment or machinery can be performed, using a user program such as the above (monitoring request program 170).

H. Serialization Module

The control device 100 constituting the control system 1 according to the present embodiment realizes faster data collection, by implementing the internal DB 130. As a technique for increasing the speed of this data collection, serialization technology and deserialization technology such as described next may be employed. Such serialization technology and deserialization technology may be provided by a serialization module 172 (FIG. 5).

h1: Data Compression by Serialization

First, data compression by serialization will be described. FIG. 13 is a schematic diagram for illustrating serialization processing in the control device 100 of the control system 1 according to the present embodiment. Referring to FIG. 13, the case where, for example, the data that is collected in the internal DB 130 is stipulated by so-called key value pairs is assumed. That is, it is assumed that target input data is stipulated by a combination of "key" data indicating the meaning of a certain value and the actual value. In this case, redundant information is also included, and thus the serialization module 172 serializes this input data to reduce (compress) the data amount.

As one example, a method that involves data that is included in input data first being divided into unit data and then replaced with truncated data indicating the respective unit data is envisaged. Alternatively, as shown in FIG. 13, data to be targeted may be converted into machine code that can be directly interpreted by the processor 102. In other words, the serialization module 172 may realize data compression, by converting target data using machine code.

The redundancy inherent in the original input data can be reduced, through such conversion into machine code. Also, the machine learning engine 140 is able to directly interpret input data even in a data-compressed state, and thus may be configured to perform machine learning using data-compressed input data.

In this way, the access speed to the internal DB 130 can be enhanced, by carrying out data compression processing, before data writing to the internal DB 130.

h2: Increasing Deserialization Processing Speed

In the case where data is stored in the internal DB 130 in a serialized state such as described above, the reverse conversion to serialization, that is, deserialization, needs to be performed when accessing the data. A technique for increasing processing speed such as described below is also employed for such deserialization.

Figure 14:
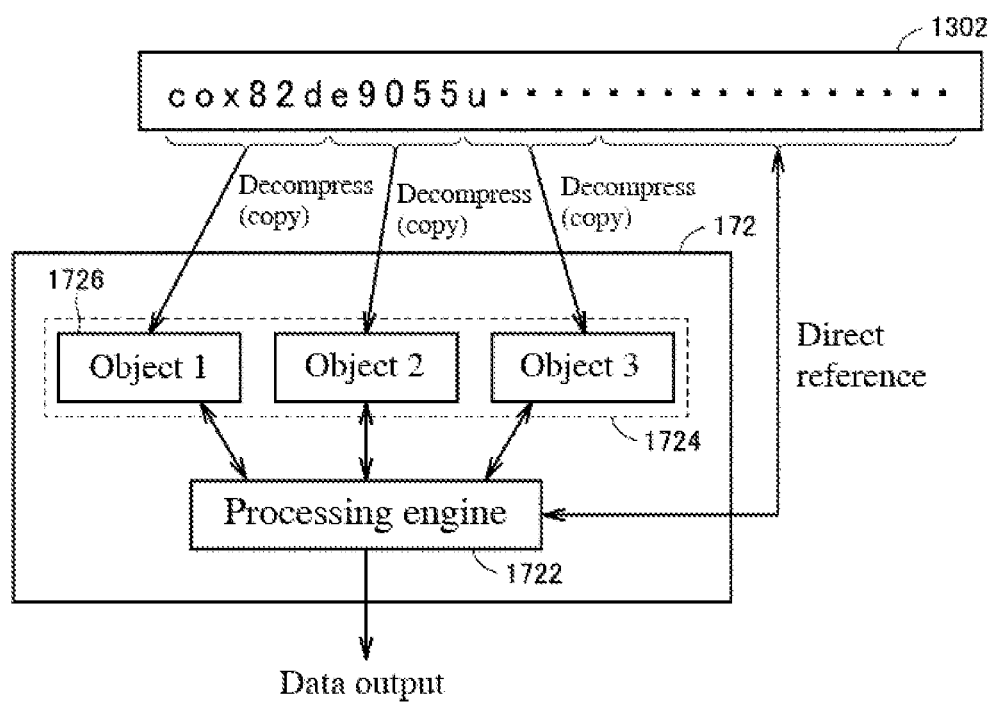
FIG. 14 is a schematic diagram for illustrating deserialization processing in the control device of the control system according to the embodiment.

FIG. 14 is a schematic diagram for illustrating deserialization processing in the control device 100 of the control system 1 according to the present embodiment. Referring to FIG. 14, the case where desired target data 1302 is read out from the internal DB 130 is assumed. The target data 1302 has been serialized, and it would originally be necessary to deserialize the entirety of the target data 1302.

In contrast, in the control device 100 according to the present embodiment, a processing engine 1722 of the serialization module 172 copies some of the data that is included in the target data 1302 to a buffer area 1724, and generates one or a plurality of objects 1726 required in deserialization of the target data 1302 in the buffer area 1724. The processing engine 1722 of the serialization module 172 then, with regard to the remaining data of the target data 1302, outputs the result of deserializing the target data 1302, while referring to the generated one or plurality of objects 1726, without copying the data to the buffer area 1724, or the like.

In this way, deserialization can be completed by copying only some of the target data rather than reading out and copying all of the serialized data, thus enabling faster readout processing.

I. Direct Data Writing by Machine Learning Engine Interface

Figure 15:
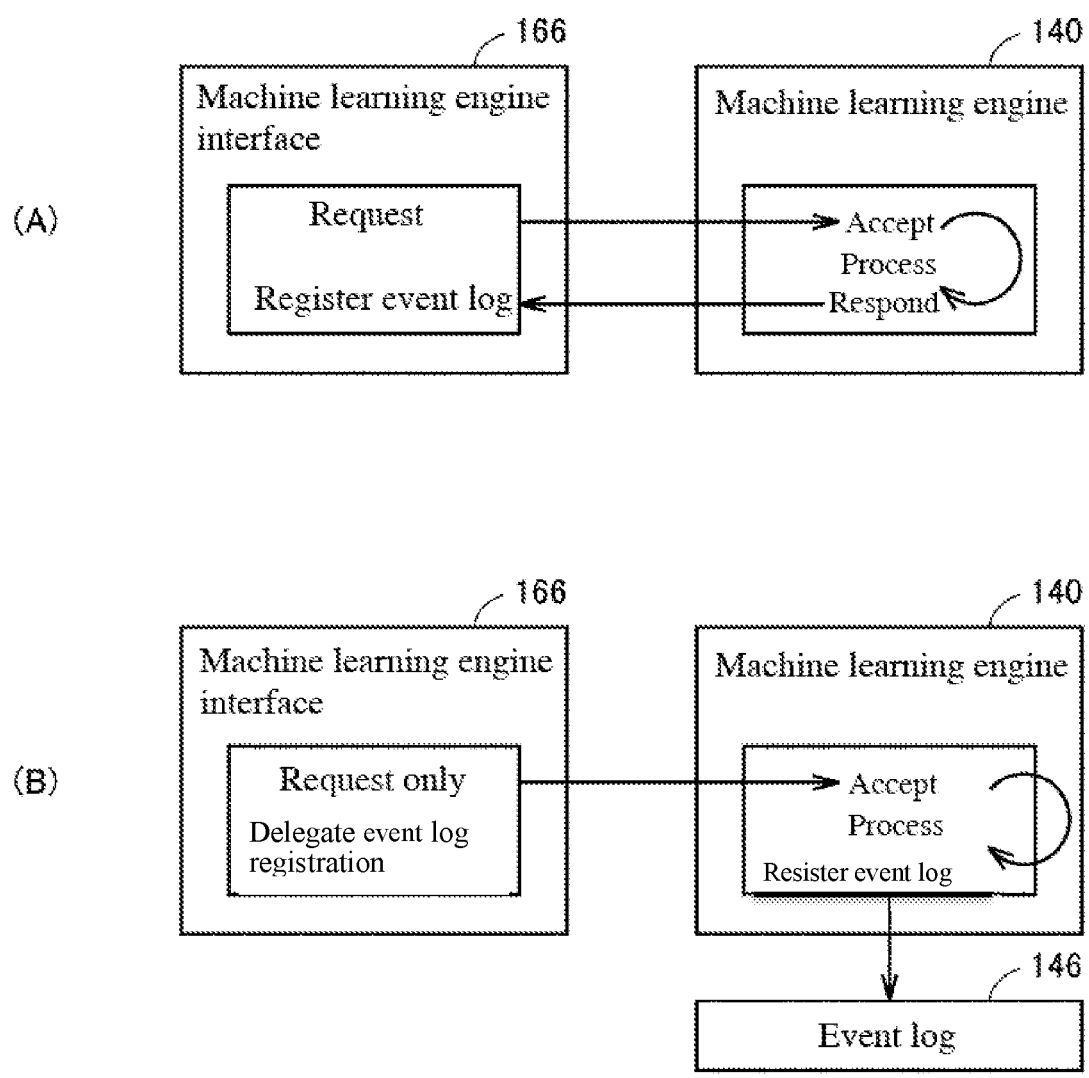
FIG. 15 is a schematic diagram for illustrating data exchange between a machine learning engine interface and a machine learning engine in the control device of the control system according to the embodiment.

Next, data exchange between the machine learning engine interface 166 and the machine learning engine 140 will be described. FIG. 15 is a schematic diagram for illustrating data exchange between the machine learning engine interface 166 and the machine learning engine 140 in the control device 100 of the control system 1 according to the present embodiment.

FIG. 15(A) shows typical data exchange under a server-client model. In this configuration, when the machine learning engine interface 166 transmits a request to the machine learning engine 140, the machine learning engine 140 performs processing upon accepting the request, and responds with the processing results. The machine learning engine interface 166 then receives the response from the machine learning engine 140, and registers an event log.

In the case of adopting such a configuration in which a request is transmitted and processing is performed after waiting for a response to the request, the next processing cannot be executed while waiting for the response and processing has to be temporarily interrupted.

In contrast, in the control device 100 according to the present embodiment, the response waiting time in the machine learning engine interface 166 is reduced, by delegating processing regarding the response to the request (in this example, event log registration) from the machine learning engine interface 166 to the machine learning engine 140, as shown in FIG. 15(B). That is, in the configuration shown in FIG. 15(B), the machine learning engine interface 166 performs only transmission of the request to the machine learning engine 140. The machine learning engine 140 then performs processing upon accepting the request from the machine learning engine interface 166, and registers the event log 146 upon receiving the processing result thereof.

In this way, the machine learning engine interface 166 need only transmit the required request to the machine learning engine 140, and is able to carry on with subsequent processing, without waiting for processing such as a response thereafter. In other words, the machine learning engine interface 166 transmits the request required in anomaly detection to the anomaly detection function 144, and the anomaly detection function 144 carries out detection of anomalies, without sending a response to the request to the machine learning engine interface 166.

By adopting such configuration, the exchange of data between the machine learning engine interface 166 and the machine learning engine 140 can be performed faster. In other words, processing in the machine learning engine interface 166 and processing in the machine learning engine 140 can be executed asynchronously, and the processing waiting time in the machine learning engine interface 166 can thereby be reduced.

J. Application Example

Next, an application example that uses the control system 1 according to the present embodiment will be described.

Figure 16:
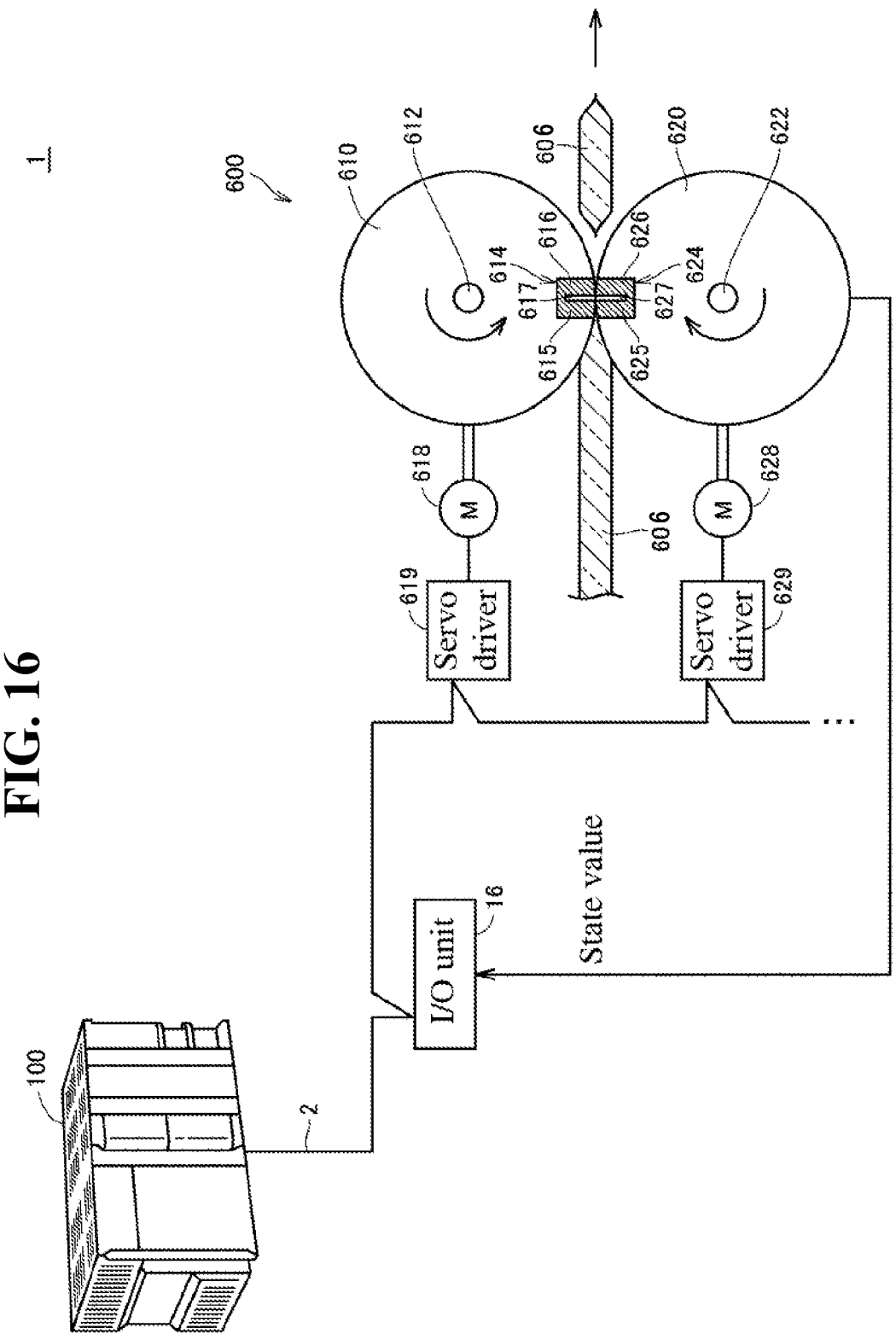
FIG. 16 is a schematic diagram showing one application example of the control system according to the embodiment.

FIG. 16 is a schematic diagram showing one application example of the control system 1 according to the present embodiment. In FIG. 16, an example of the case where the present invention is constituted as a control system 1 that includes a packaging machine 600 is shown.

Referring to FIG. 16, the packaging machine 600 uses a rotor to sequentially perform at least one of sealing and cutting of a package 604 that is conveyed in a predetermined conveyance direction. The packaging machine 600 has a pair of rotors 610 and 620, and the rotors 610 and 620 rotate synchronously. The rotors are disposed such that the tangential direction of the outer periphery at a position that touches the package 604 coincides with the conveyance direction. In each rotor, a heater and a cutter are disposed in positions determined in advance, and processing for sealing and cutting of the package 604 is realized, by the heater and cutter contacting the package 604.

The rotors 610 and 620 of the packaging machine 600 are rotationally driven synchronously about respective rotation axes 612 and 622 by servo motors 618 and 628. Processing mechanisms 614 and 624 are respectively provided on the surface of the rotors 610 and 620, and the processing mechanism 614 includes heaters 615 and 616 disposed front and back in the circumferential direction (rotational direction), and a cutter 617 disposed between the heater 615 and the heater 616. Similarly, the processing mechanism 624 includes heaters 625 and 626 disposed front and back in the circumferential direction, and a cutter 627 disposed between the heater 625 and the heater 626. The rotors 610 and 620 include the cutters 617 and 627 which are disposed on the outer peripheral surface and are for cutting the package 604.

By the rotors 610 and 620 rotating in synchronization with the conveyance speed of the package 604, opposing surfaces (upper surface and lower surface) are sealed (adhered) at a position on the right side (on the page) of the package 604 by the heater 615 and the heater 625, and opposing surfaces (upper surface and lower surface) are sealed (adhered) at a position on the left side (on the page) of the package 604 by the heater 616 and the heater 626. The package 604 is cut by the cutter 617 and the cutter 627, in parallel with this seal processing. By such a series of processing being repeated, sealing and cutting are repeatedly executed on the package 604 including a packaged item 605, and individual packages 606 are sequentially generated.

The rotational speed, torque and the like of the servo motors 618 and 628 that rotationally drive the rotors 610 and 620 are controlled by servo drivers 619 and 629 which are an example of a driver (driving device). The control device 100 is able to collect state values of the servo motors 618 and 628, that is, performance values of the rotors 610 and 620, from the servo drivers 619 and 629. (1) Rotation position (phase/rotation angle), (2) speed, (3) acceleration, (4) torque value, (5) current value, (6) voltage value and the like are included as state values of the servo drivers 619 and 629 (or performance values of the rotors 610 and 620).

The control device 100 detects jamming of foreign matter, using the state values of the servo drivers 619 and 629 (or the rotors 610 and 620).

A foreign matter jam can occur due to positional shift of the package 604 itself, positional shift of the packaged item 605 contained in the package 604, and the like. Due to a foreign matter jam occurring, a larger torque occurs in the servo motors 618 and 628 that rotationally drive the rotors 610 and 620. There are cases where the anomaly of a foreign matter jam can be detected, by monitoring such changes in torque.

Figure 17:
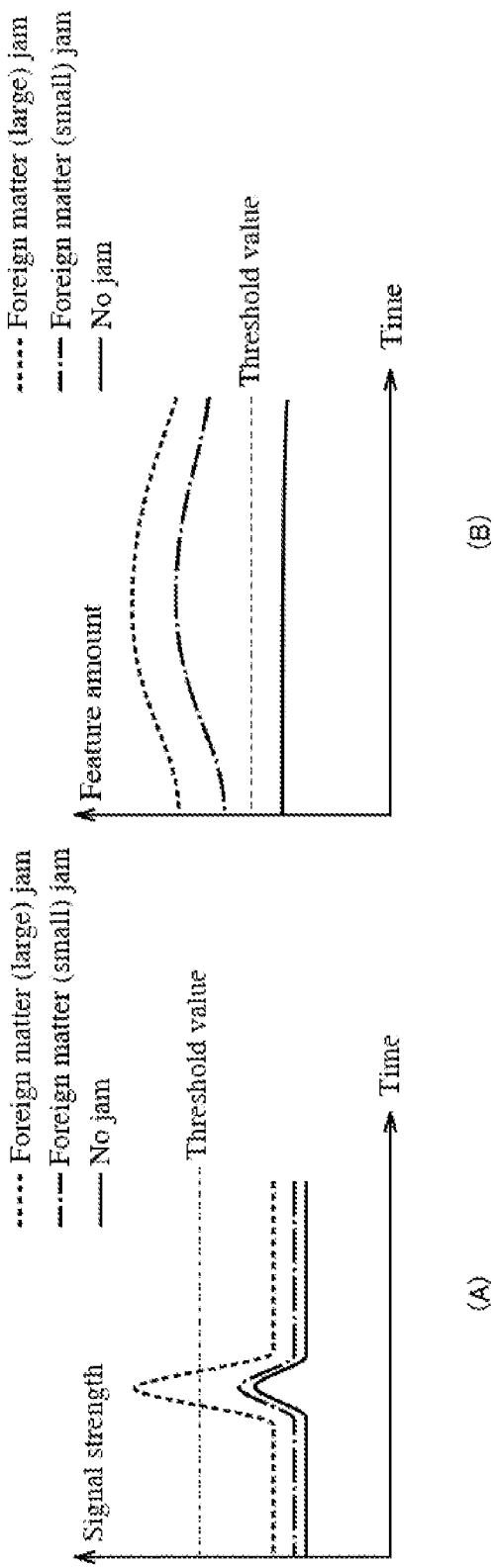
FIG. 17 is a diagram showing an example of a state value at the time when a foreign matter jam occurs in the control system shown in FIG. 16, and the change in a feature amount that is generated from the state value.

FIG. 17 is a diagram showing an example of state values at the time when a foreign matter jam occurs in the control system 1 shown in FIG. 16 and the change in the feature amount that is generated from the state values. In FIG. 17(A), an example of the temporal change in signal strength that relates to the force that acts on the rotors 610 and 620 is shown. In the example of the temporal change in signal strength shown in FIG. 17(A), in the case where relatively large foreign matter is jammed, the change in signal strength is large and exceeds a threshold value determined in advance, and thus an anomaly can be detected.

On the other hand, in the case where relatively small foreign matter is jammed, the change in signal strength is small, and does not reach the threshold value determined in advance. Thus, an anomaly cannot be detected for jamming of relatively small foreign matter.

In the case where the anomaly detection function that is provided by the control system 1 according to the present embodiment is used in such a situation, an appropriate feature amount and an appropriate anomaly detection parameter can be set, thus enabling anomalies that cannot be detected by directly observing the torque acting on the rotors to also be detected.

As an example, by creating a feature amount such as shown in FIG. 17(B), a foreign matter jam can be sufficiently distinguished from a normal state in which jamming has not occurred, even when relatively small foreign matter is jammed.

By setting the threshold value (anomaly detection parameter) between the feature amount that occurs in the normal state and the feature amount that occurs when a relatively small foreign matter is jammed, an anomaly can be detected, even in the case where the jammed foreign matter is relatively small.

K. Variations

A configuration may be adopted in which all or some of the functions of the support device 200 described above are incorporated in the control device 100. A configuration may also be adopted in which, for example, the data mining tool 226 implemented in the support device 200 is implemented in the control device 100. By adopting such a configuration, the functions according to the present embodiment can be utilized without installing a large number of application programs on the support device 200 side.

Also, the module configuration shown in FIG. 5 and FIG. 6 is given as an example, and any form of implementation may be employed, as long as functions such as described above can be provided. For example, depending on hardware restrictions, programming restrictions, or the like, the functional modules shown in FIG. 5 and FIG. 6 may be implemented as a set of a plurality of functional modules or a plurality of the functional modules shown in FIG. 5 and FIG. 6 may be implemented as a single module.

L. Advantages

With the control system according to the present embodiment, it is possible to implement a database for collecting data in a control device that exchanges data with a field, and to also perform machine learning using the data collected in the database and further detect the presence of an anomaly using the result of machine learning. By adopting such a control device having increased functionality, a technology that enables a phenomenon occurring in a control target to be monitored in a shorter cycle can be realized, as compared with existing configurations.

The embodiments disclosed herein are considered in all respects to be illustrative and not restrictive. The scope of the invention is indicated by the claims rather than by the foregoing description, and all changes that come within the meaning and range of equivalency of the claims are intended to be encompassed therein.

INDEX TO THE REFERENCE NUMERALS

1 Control system
2 First field network
4 Second field network
6 Local network
10 Field device group
12 Remote I/O device
14 Relay group
16, 124 I/O unit
18 Image sensor
20 Camera
22, 619, 629 Servo driver
24, 618, 628 Servo motor
100 Control device
102, 202 Processor
104 Chip set
106, 206 Main storage device
108, 208 Secondary storage device
110, 214 Local network controller
112, 212 USB controller
114 Memory card interface
116 Memory card
118, 120 Field bus controller
122 Internal bus controller
130 Internal DB
132 Raw data
134 Learning result
136 Anomaly detection result
140 Machine learning engine
142 Learning function
144 Anomaly detection function
146 Event log
150 PLC engine
152 Scheduler
154 Variable manager
160 Control program
162 Sequence/motion program
164 Internal DB writing program
166 Machine learning engine interface
168 Learning request program
170 Monitoring request program
172 Serialization module
174 Feature amount generation program
190 OS
200 Support device
204 Optical drive
205 Recording medium
216 Input unit
218 Display unit
220 Bus
222 Development program
224 Parameter setting tool
226 Data mining tool
300 Data logging device
400 Display device
500 User interface screen
502 Specific information
504, 505, 506 Candidate
508 Radio button
600 Packaging machine
604 Package
605 Packaged item
606 Individual package
610, 620 Rotor
612 Rotation axis
614, 624 Processing mechanism
615, 616, 625, 626 Heater
617, 627 Cutter
1302 Target data
1684, 1704, 1744 Input variable designation
1542 System variable 1544 Device variable
1546, 1706 Anomaly detection parameter
1642 Write function block
1644 Table name
1646 Target variable designation
1648 Cycle designation
1682 Learning request function block
1686 Learning result output destination designation
1702 Monitoring request function block
1708 Failure output destination designation
1722 Processing engine
1724 Buffer area
1726 Object
1742 Feature amount generation function block
1746 Output destination designation
1748, 1749 Condition
2242 Variable access program
2262 Access function
2264 Data mining function
2266 Visualization function

The invention claimed is:

1. A control device for controlling a control target, comprising a processor configured with a program to perform operations comprising:
   operation as a control logic configured to execute computations for the control target; and
   operation as a machine learning engine, wherein
   the control logic is configured to perform:
      generating a feature amount suitable for detecting an anomaly that occurs in the control target from data that relates to the control target;
      instructing a machine learning engine to perform detection of the anomaly; and
      data-compressing the generated feature amount, and providing the data-compressed feature amount to the machine learning engine,
   the machine learning engine is configured to perform:
      carrying out machine learning using the generated feature amount;
      detecting the anomaly, based on the generated feature amount and an anomaly detection parameter determined based on a learning result of the machine learning and used in detection of the anomaly that occurs in the control target,
   the instructing by the control logic comprises transmitting a request required in detection of the anomaly, and
   the detecting the anomaly by the machine learning engine comprises carrying out detection of the anomaly, without sending a response to the request, such that the control logic carries on with subsequent processing without waiting for the response from the machine learning engine.

2. The control device according to claim 1, wherein the data-compressing by the control logic comprises converting data to be targeted, using machine code.

3. The control device according to claim 1, wherein the detecting the anomaly is implemented by a user program that includes designation of the anomaly detection parameter and designation of the feature amount to be targeted.

4. The control device according to claim 3, wherein the processor is configured with the program to perform operations further comprising:
   operation as a database for collecting and storing data that relates to the control target.

5. The control device according to claim 4, wherein the processor is configured with the program such that data designated in accordance with a command included in the user program is collected in the database.

6. The control device according to claim 4, wherein the processor is configured with the program to perform operations further comprising:
   determining a technique for generating the feature amount suitable for detecting the anomaly that occurs in the control target, based on the data collected in the database.

7. The control device according to claim 1, wherein the processor is configured with the program to perform operations further comprising:
   determining the anomaly detection parameter based on the learning result of the machine learning.

8. The control device according to claim 1, wherein the processor is configured with the program to perform operations further comprising:
   holding the anomaly detection parameter, and updating the anomaly detection parameter that is held, in response to a request from an external device.

9. A non-transitory computer-readable storage medium storing a control program that realizes a control device for controlling a control target by being executed by a computer, the control device including a control logic configured to execute computations for the control target and a machine learning engine, the control program, when read and executed, causes the computer to perform:
   generating, by the control logic, a feature amount suitable for detecting an anomaly that occurs in the control target from data that relates to the control target;
   data-compressing, by the control logic, the generated feature amount, and providing the data to the machine learning engine,
   instructing, by the control logic, the machine learning engine to carrying out machine learning using the generated feature amount to detect the anomaly;
   detecting the anomaly, by the machine learning engine, based on the generated feature amount and an anomaly detection parameter determined based on a learning result of the machine learning and used in detection of the anomaly that occurs in the control target;
   wherein the detecting the anomaly comprises carrying out, after an instruction for the detection of the anomaly is transmitted, detection of the anomaly, without sending a response to the request, such that the control logic carries on with subsequent processing without waiting for the response.

10. A control method that is executed by a control device for controlling a control target, the control device comprising a control logic configured to execute computations for the control target and a machine learning engine, the control method comprising:
   generating, by the control logic, a feature amount suitable for detecting an anomaly that occurs in the control target from data that relates to the control target;
   data-compressing, by the control logic, the generated feature amount, and providing data to the machine learning engine,
   instructing, by the control logic, the machine learning engine to carrying out machine learning using the generated feature amount to detect the anomaly;
   detecting the anomaly, by the machine learning engine, based on the generated feature amount and an anomaly detection parameter determined based on a learning result of the machine learning and used in detection of the anomaly that occurs in the control target;

wherein the detecting the anomaly comprises carrying out, after an instruction for the detection of the anomaly is transmitted, detection of the anomaly, without sending a response to the request, such that the control logic carries on with subsequent processing without waiting for the response.

11. The control device according to claim 2, wherein the detecting the anomaly is implemented by a user program that includes designation of the anomaly detection parameter and designation of the feature amount to be targeted.

12. The control device according to claim 11, wherein the processor is configured with the program to perform operations further comprising:

operation as a database for collecting and storing data that relates to the control target.

13. The control device according to claim 12, wherein the processor is configured with the program such that data designated in accordance with a command included in the user program is collected in the database.

14. The control device according to claim 12, wherein the processor is configured with the program to perform operations further comprising:

determining a technique for generating the feature amount suitable for detecting the anomaly that occurs in the control target, based on the data collected in the database.

15. The control device according to claim 2, wherein the processor is configured with the program to perform operations further comprising:

determining the anomaly detection parameter based on the learning result of the machine learning.

16. The control device according to claim 2, wherein the processor is configured with the program to perform operations further comprising: holding the anomaly detection parameter, and updating the anomaly detection parameter that is held, in response to a request from an external device.

17. The control device according to claim 3, wherein the processor is configured with the program to perform operations further comprising:

determining the anomaly detection parameter based on the learning result of the machine learning.

18. The control device according to claim 3, wherein the processor is configured with the program to perform operations further comprising: holding the anomaly detection parameter, and updating the anomaly detection parameter that is held, in response to a request from an external device.

* * * * *